United States Patent [19]
Bhardwaj

[11] Patent Number: 5,274,631
[45] Date of Patent: Dec. 28, 1993

[54] COMPUTER NETWORK SWITCHING SYSTEM

[75] Inventor: Vinod K. Bhardwaj, San Jose, Calif.

[73] Assignee: Kalpana, Inc., San Jose, Calif.

[21] Appl. No.: 667,675

[22] Filed: Mar. 11, 1991

[51] Int. Cl.$^5$ .................. H04L 12/46; H04L 12/56
[52] U.S. Cl. .................... 370/60; 370/85.13; 370/94.1
[58] Field of Search .......... 370/60, 60.1, 85.12, 370/85.13, 85.14, 94.1, 94.2, 94.3

[56] References Cited

U.S. PATENT DOCUMENTS

| | | | |
|---|---|---|---|
| 4,707,827 | 11/1987 | Bione et al. | 370/85.13 |
| 4,744,078 | 5/1988 | Kowalczyk | 370/85.13 |
| 5,140,585 | 8/1992 | Tomikawa | 370/60.1 |
| 5,151,897 | 9/1992 | Suzuki | 370/85.13 |

OTHER PUBLICATIONS

Kalpana, Inc., EtherSwitch ™ Product Overview, pp. 1–20 Mar. 1990.
Kalpana, Inc., "EtherSwitch Question & Answers," pp. 1–4 Mar. 1990.
S. King, "Creating a New Architecture for Ethernet," Data Communications, pp. 73–79 (Aug. 1990).

*Primary Examiner*—Wellington Chin
*Attorney, Agent, or Firm*—Blakely, Sokoloff, Taylor & Zafman

[57] ABSTRACT

A network switching system is described. The network switching system comprises a first port coupled to a source, a second port coupled to a destination, and multiplexer means coupled to the first port and the second port for transferring data between the first port and the second port by selectively connecting the first port with the second port. The data is transferred from the source to the destination through the first port, the multiplexer means, and the second port. The network switching system further includes processing means coupled to the multiplexer means for assisting transmission of the data by receiving the data from the first port when the first port does not indicate a port for the destination. A method of transferring data from a source to a destination via a network switching system is also described.

23 Claims, 18 Drawing Sheets

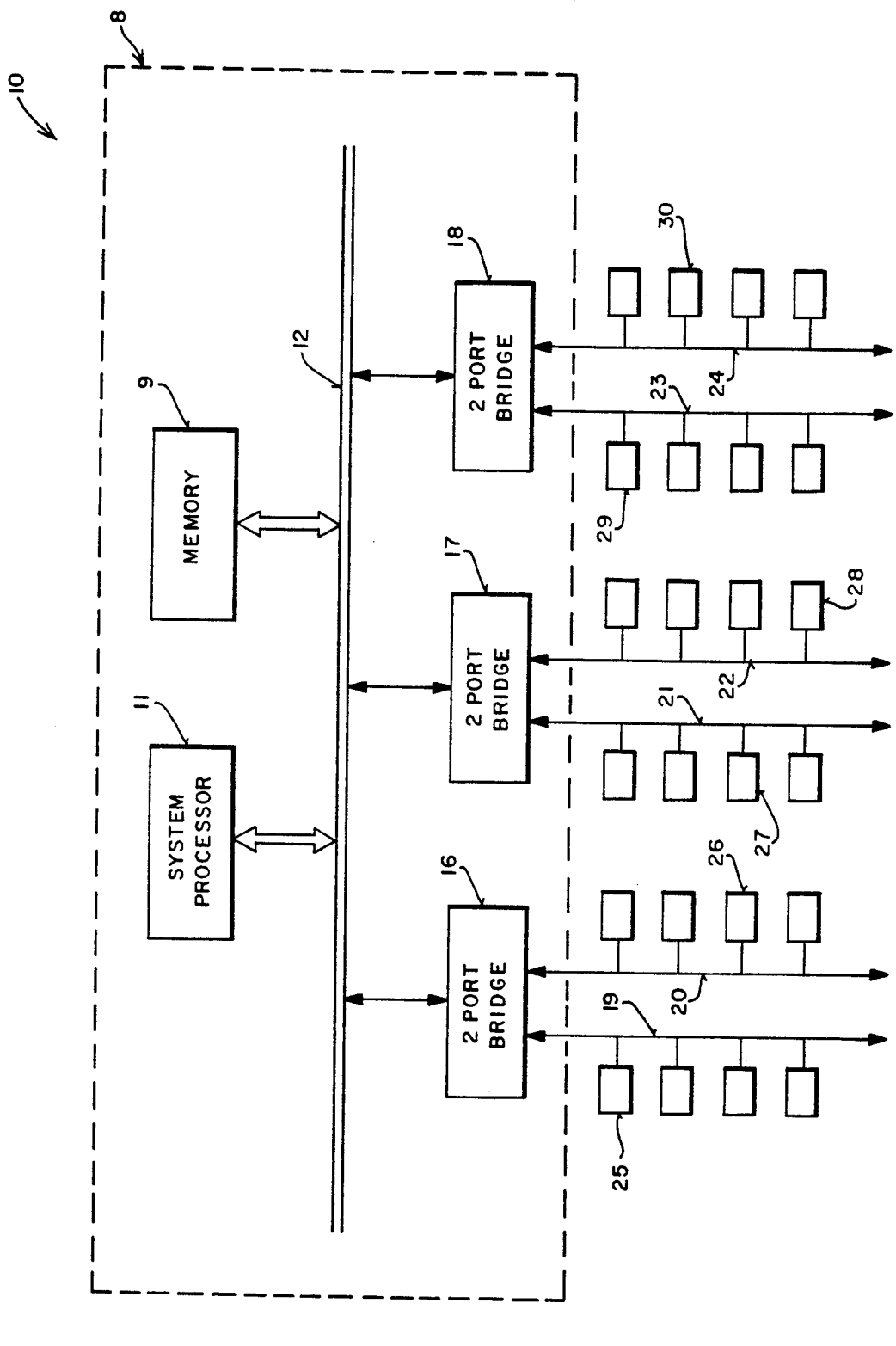
FIG_1 (PRIOR ART)

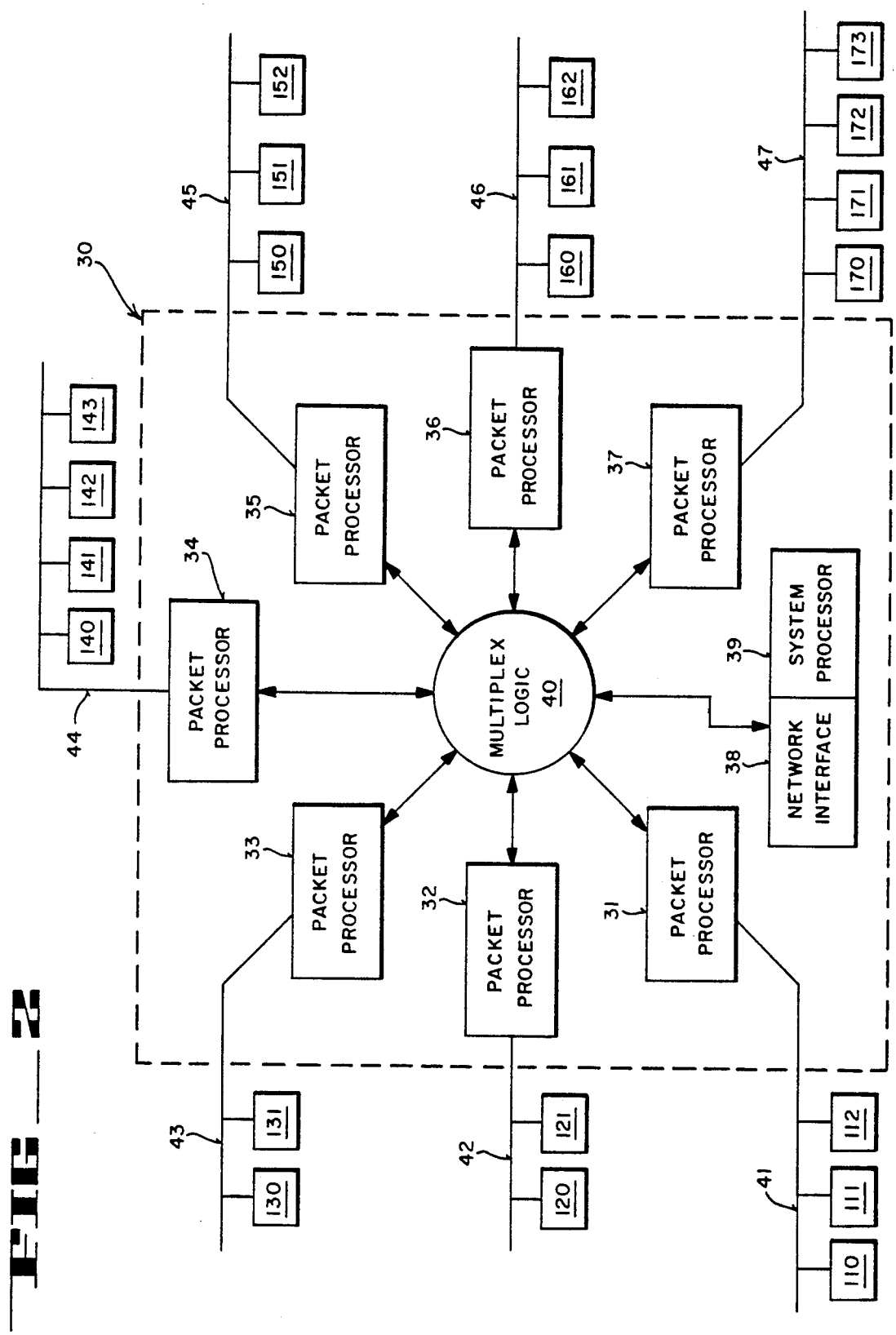
FIG_2

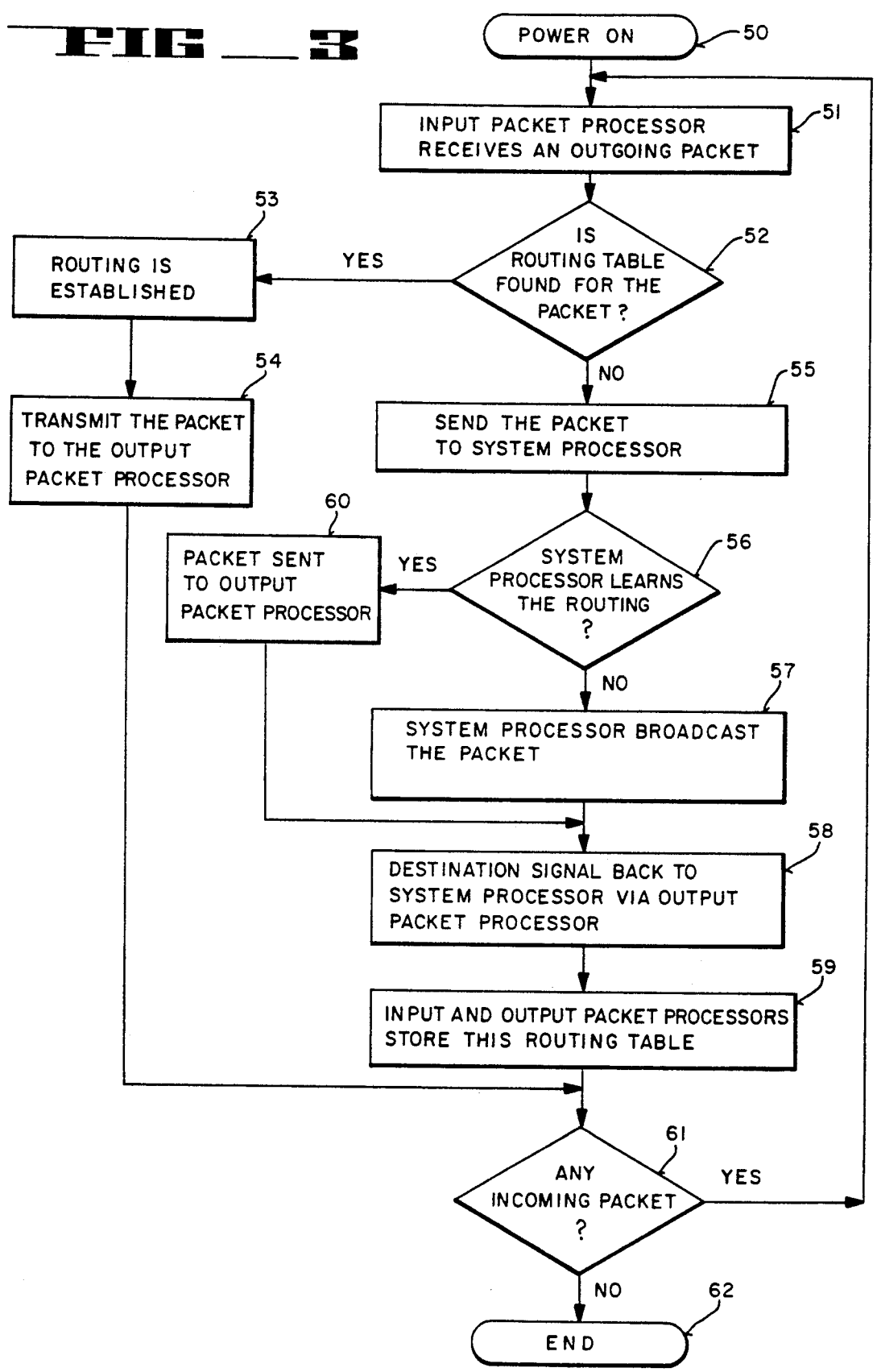

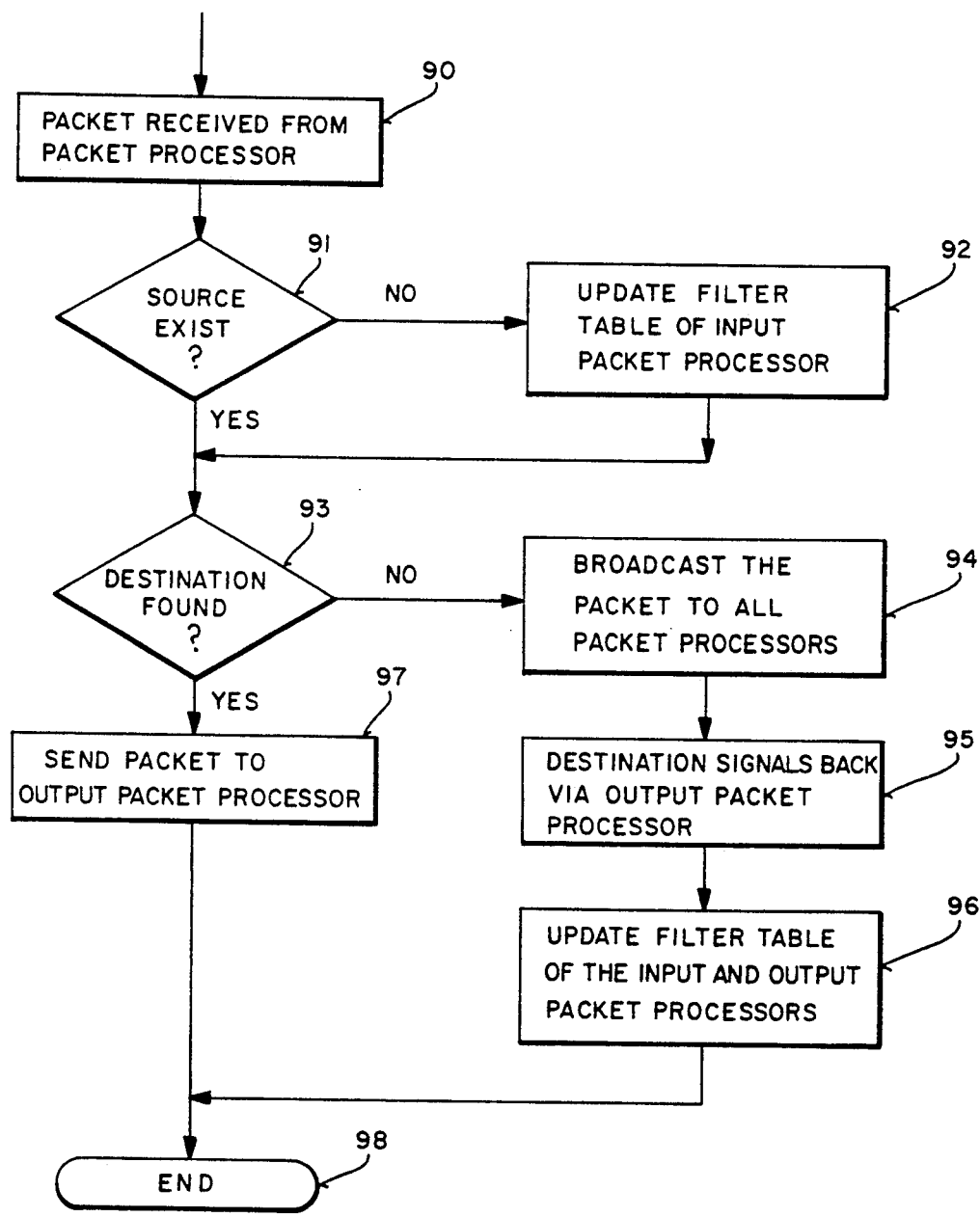

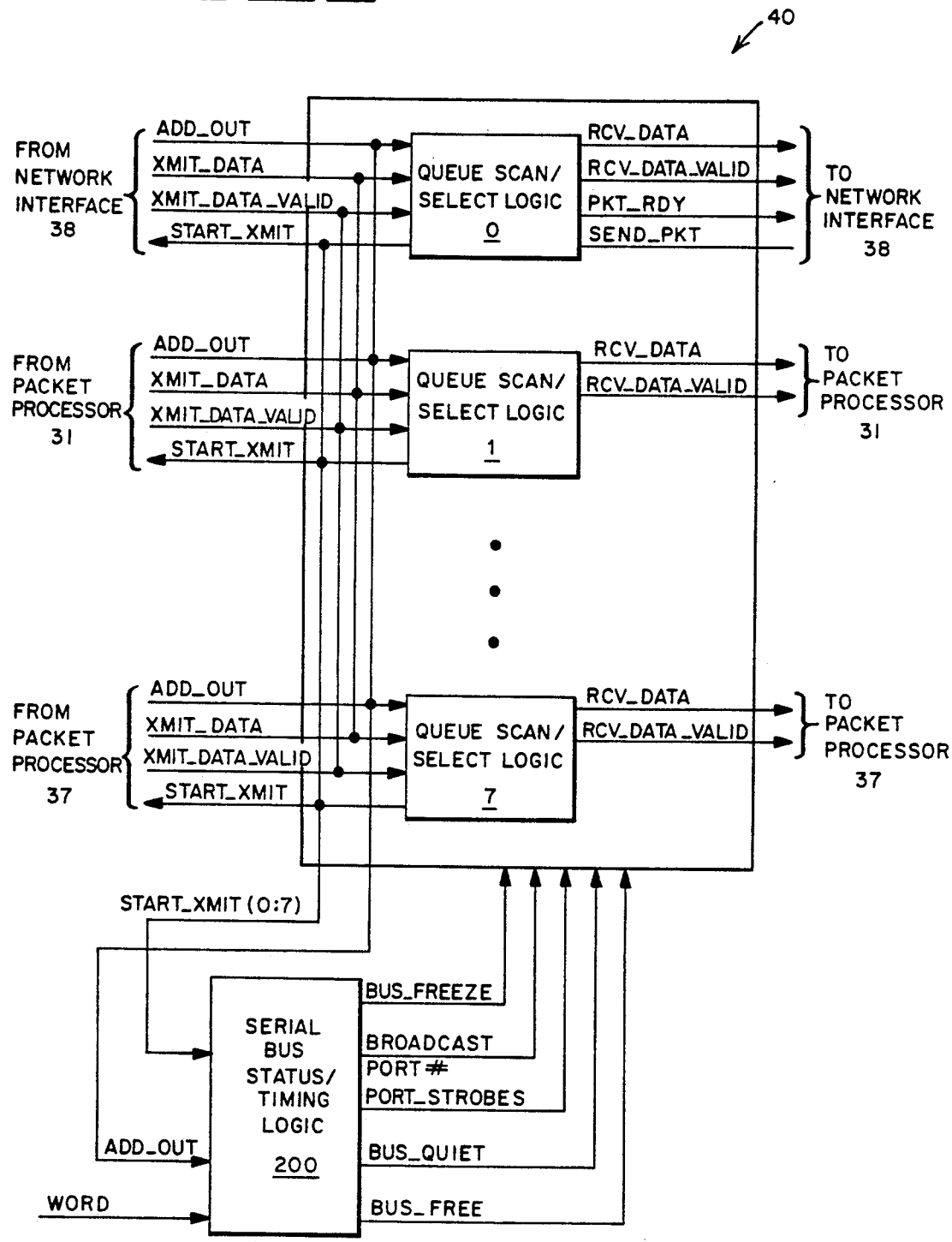

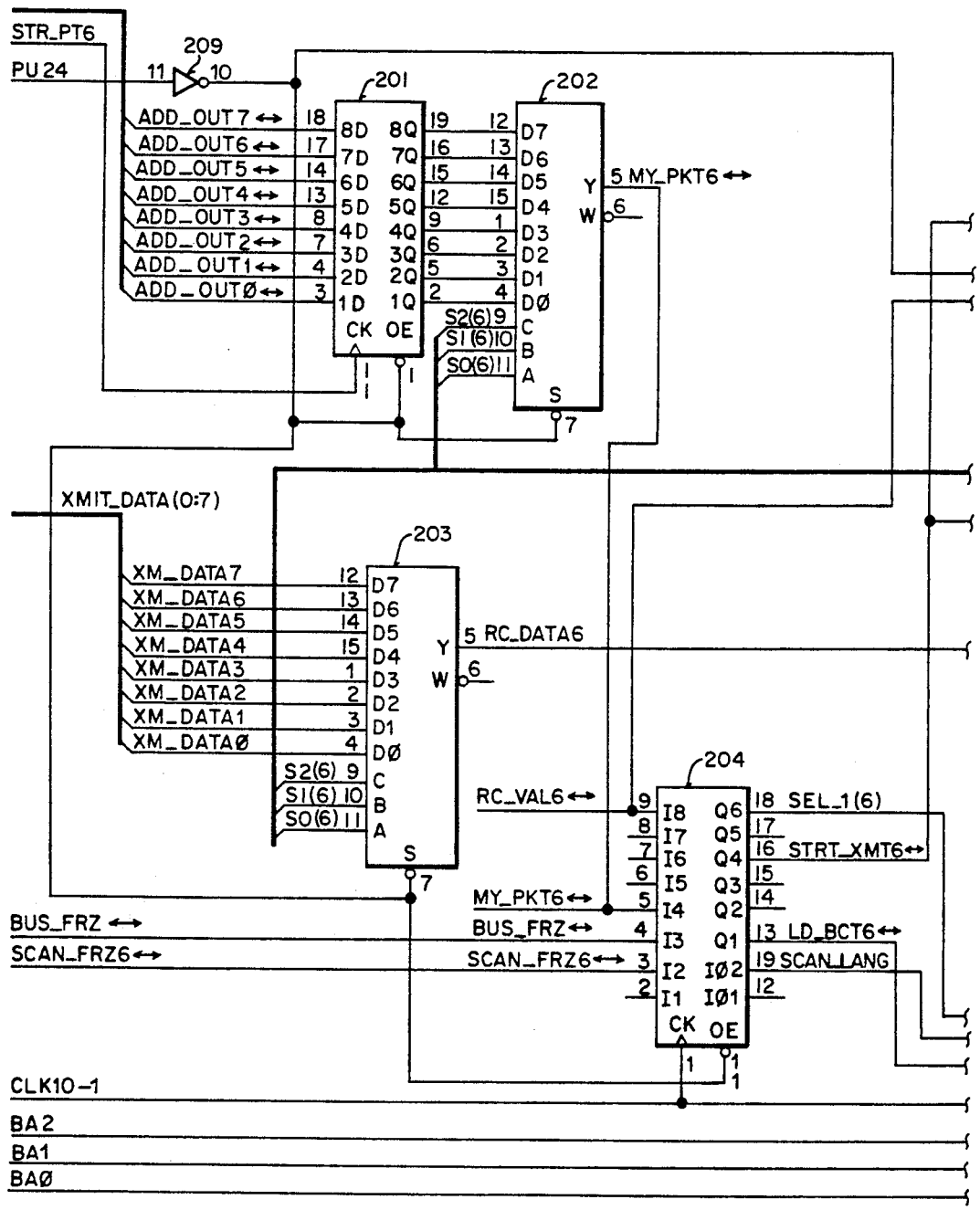

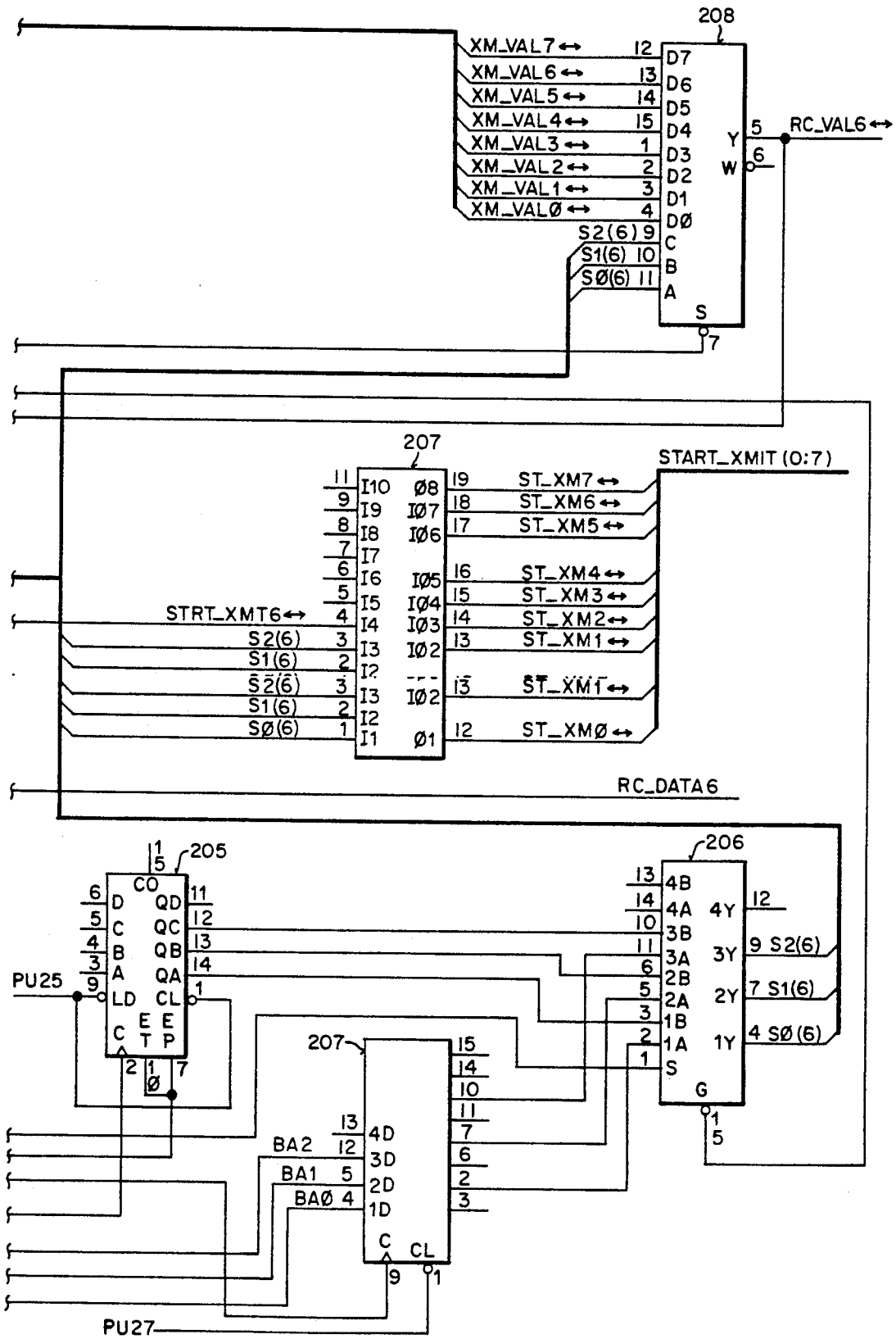
FIG_6B

FIG_7
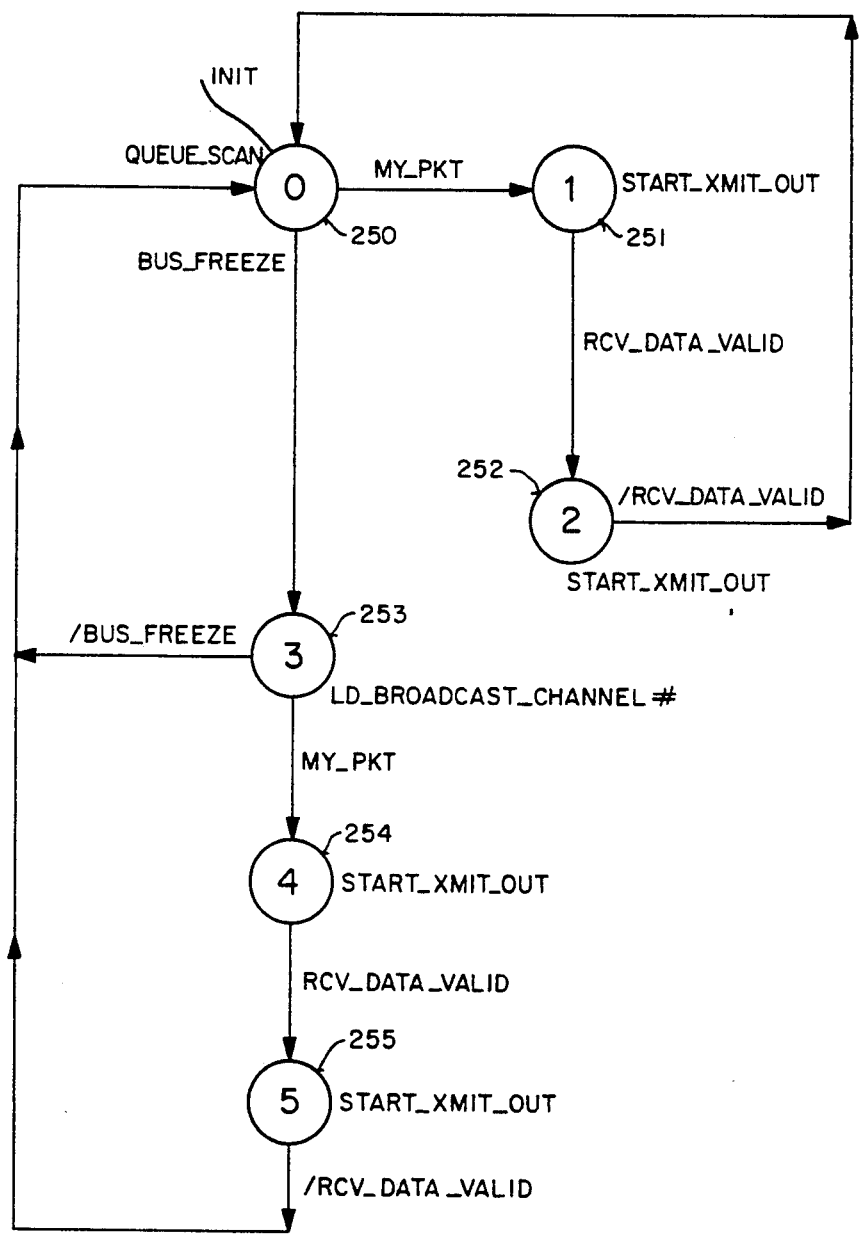
INC_QUEUE_SCAN_CTR = ST0*/MY_PKT*/BUS_FREEZE + ST2*/RCV_VALID

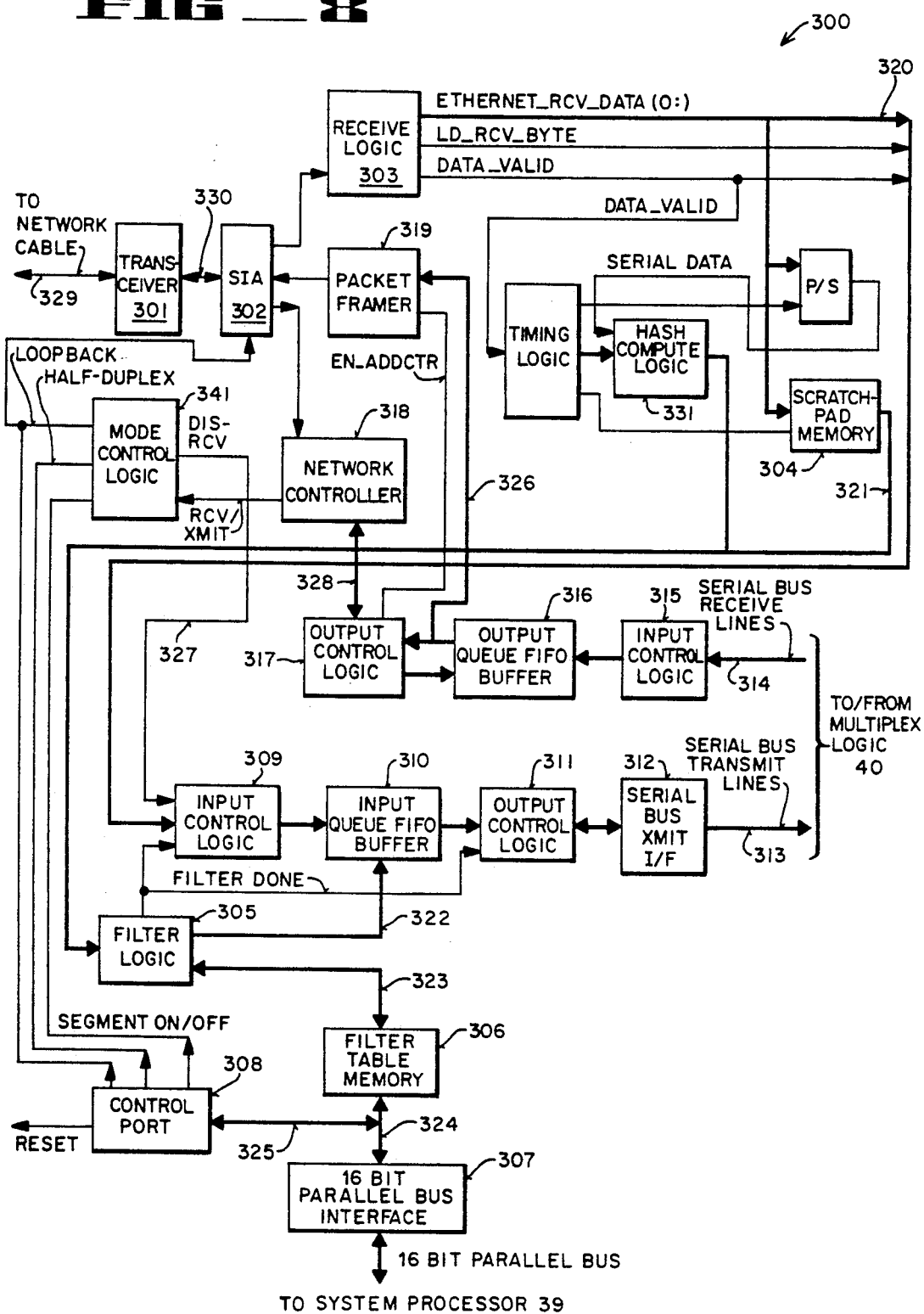

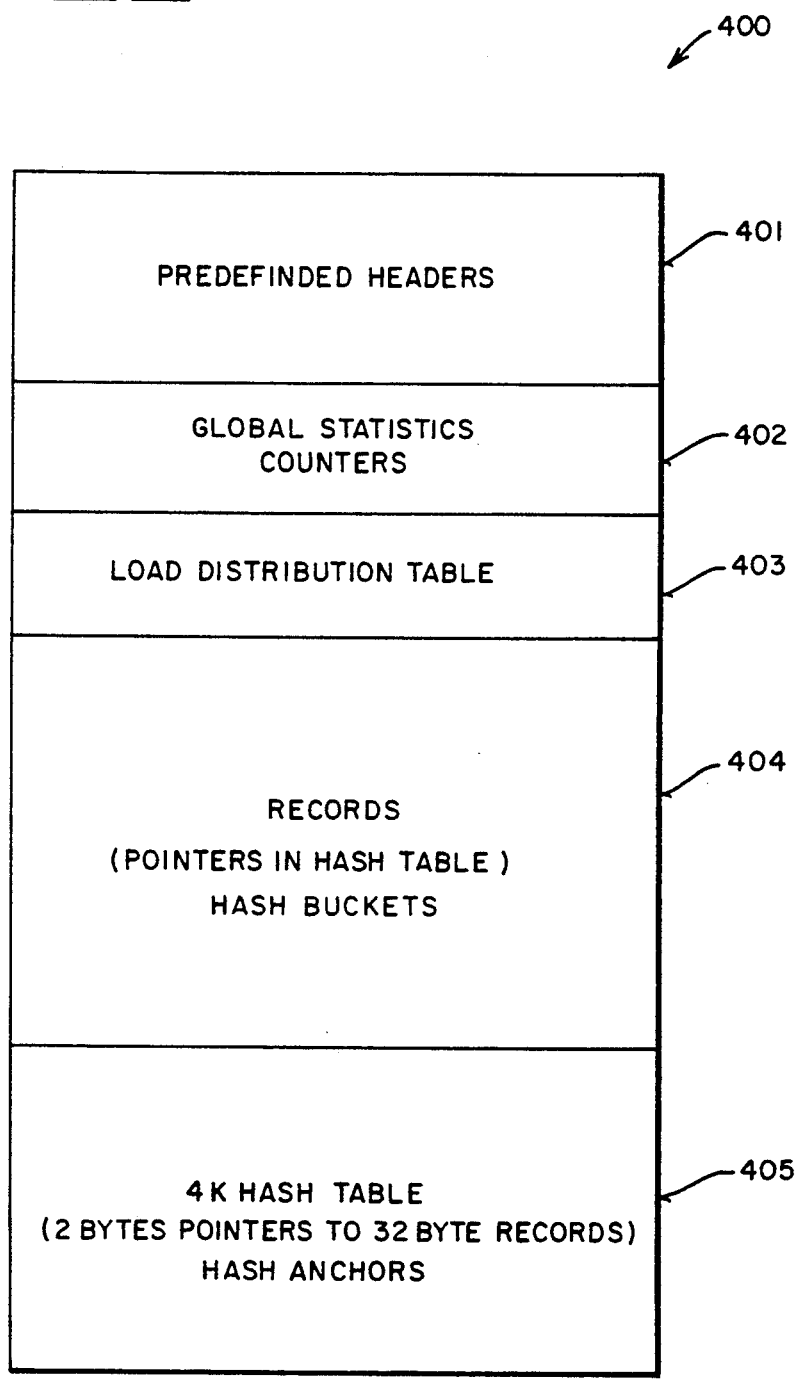
FIG _ 9

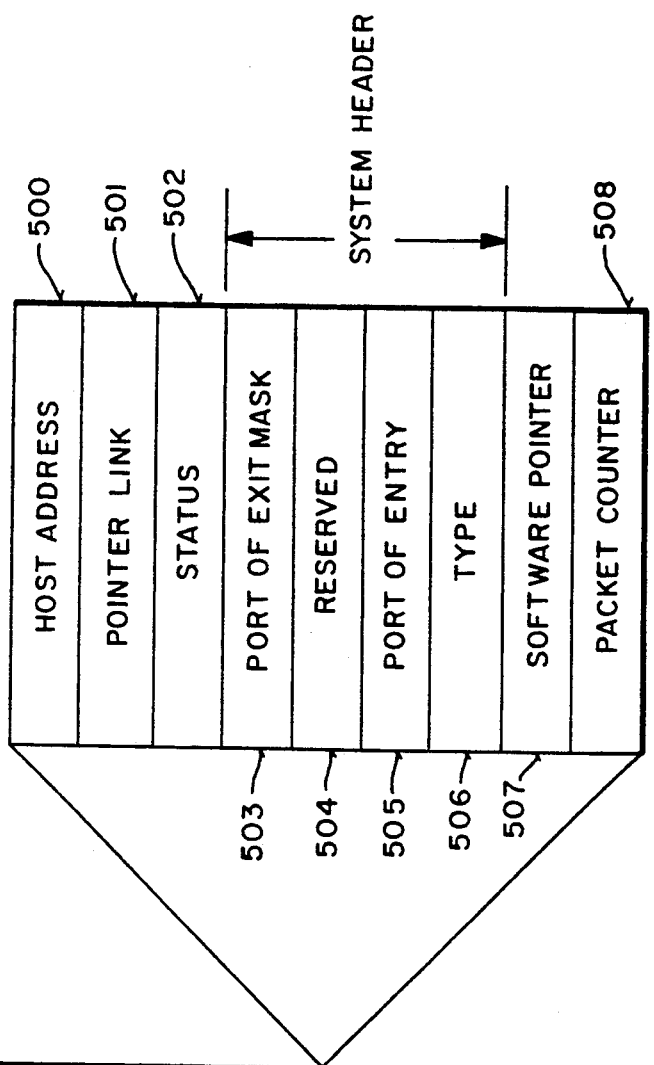
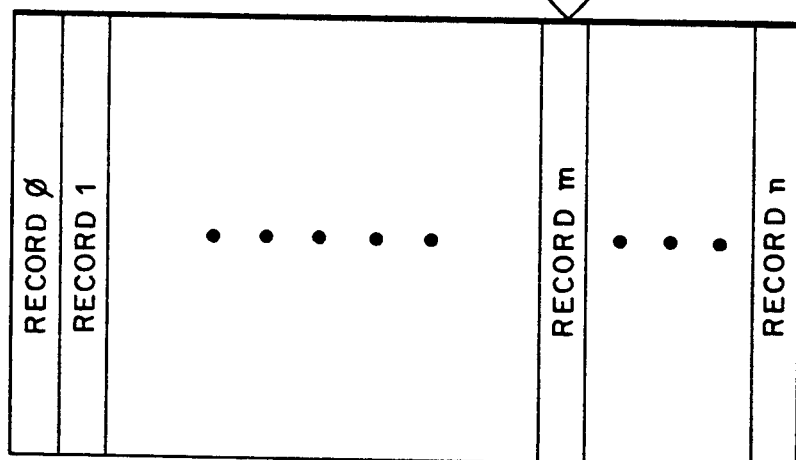
FIG_10

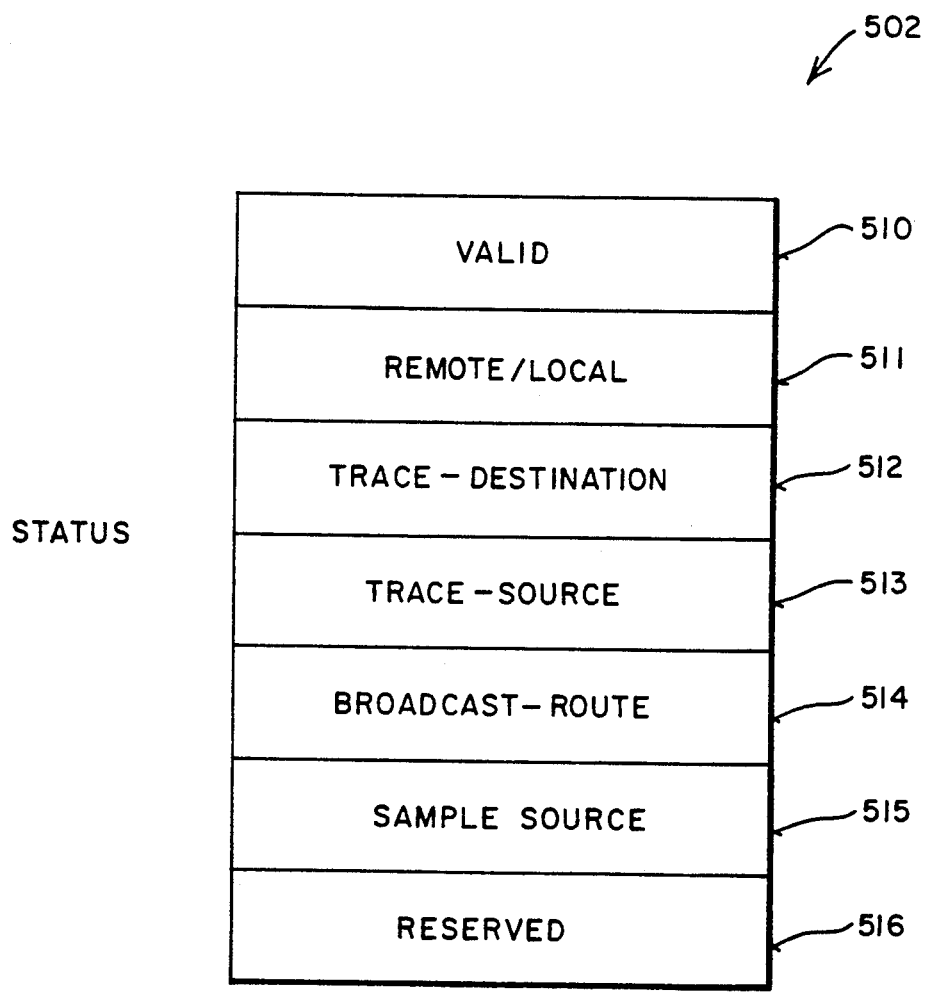
FIG_11

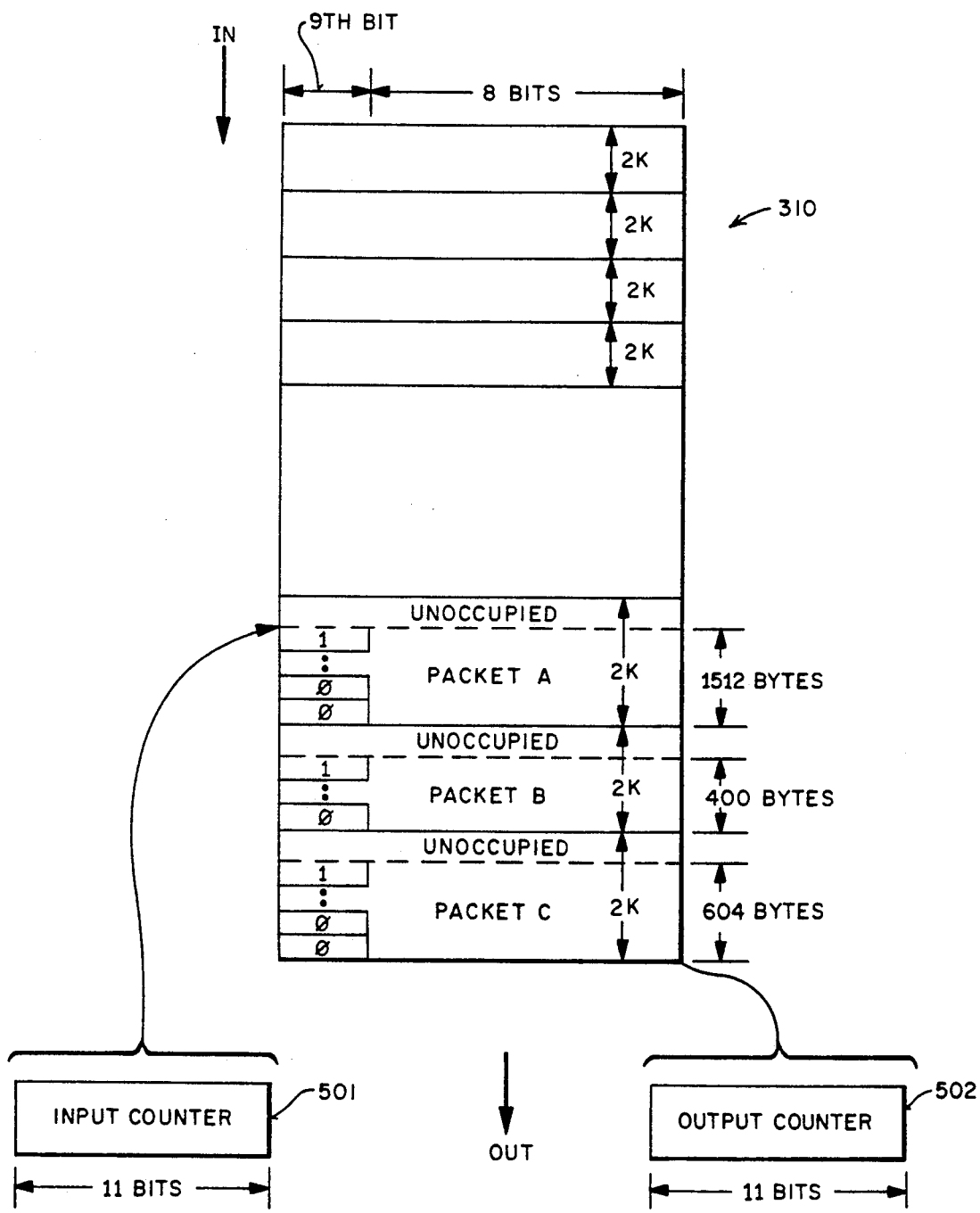
FIG_12

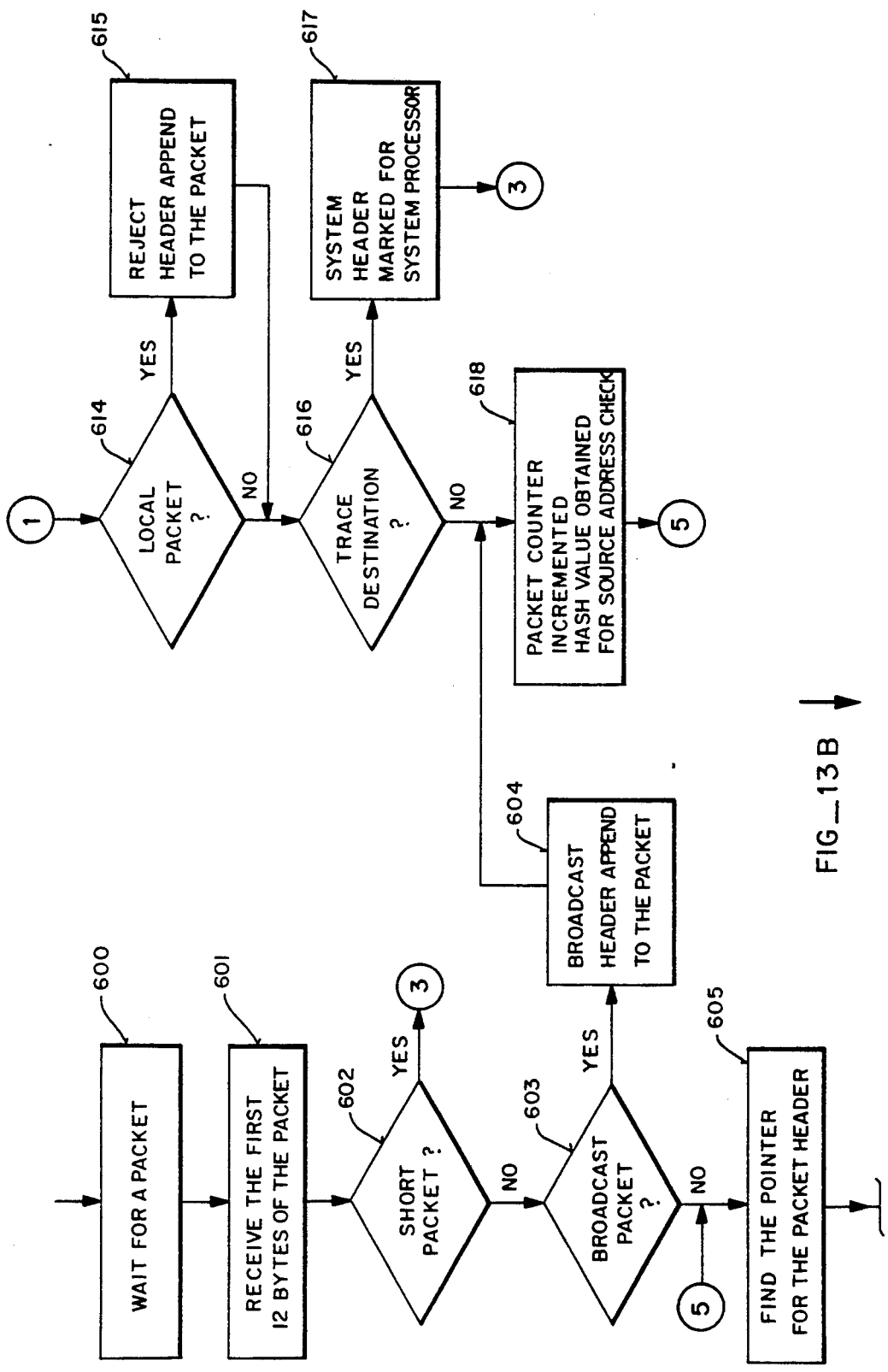

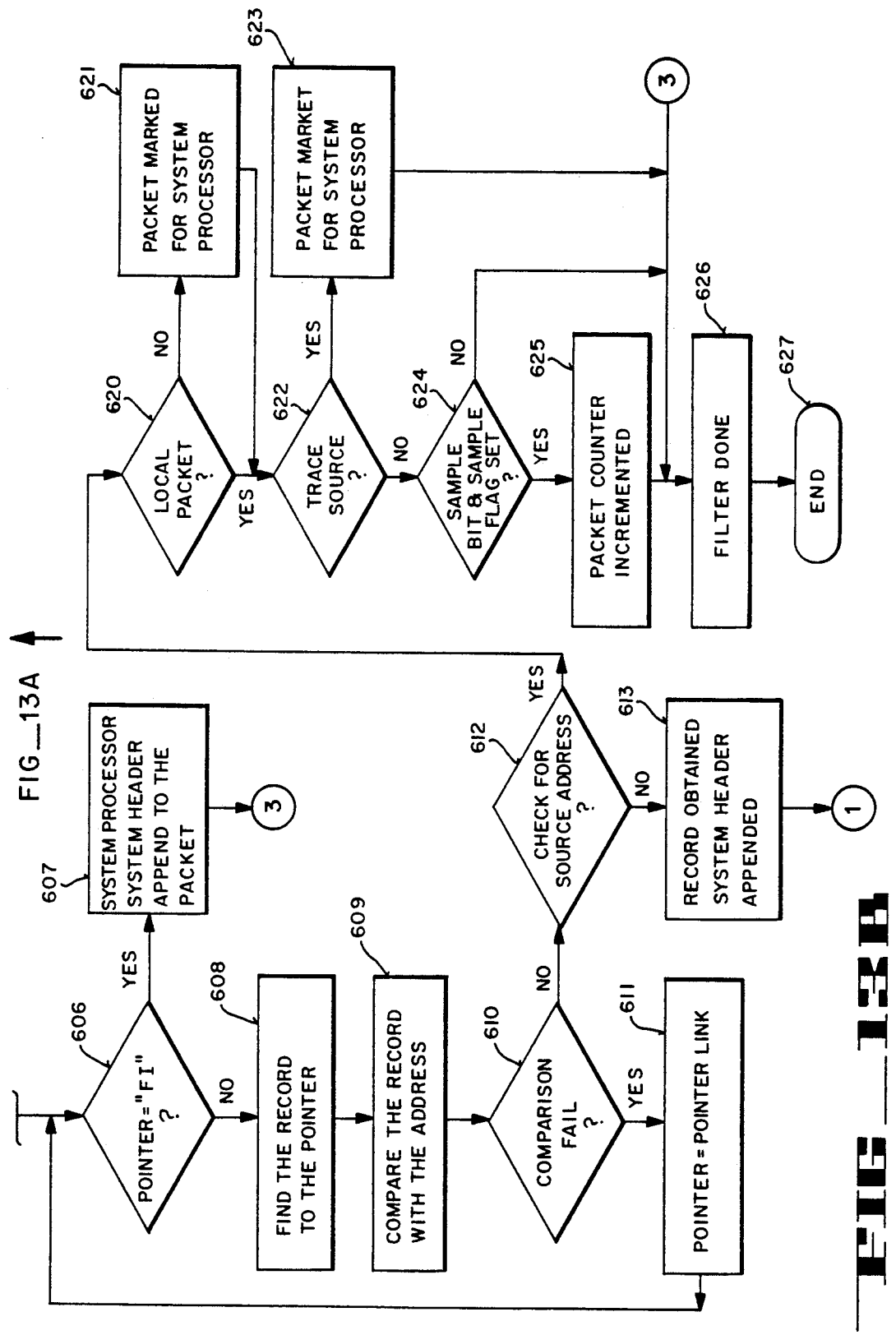

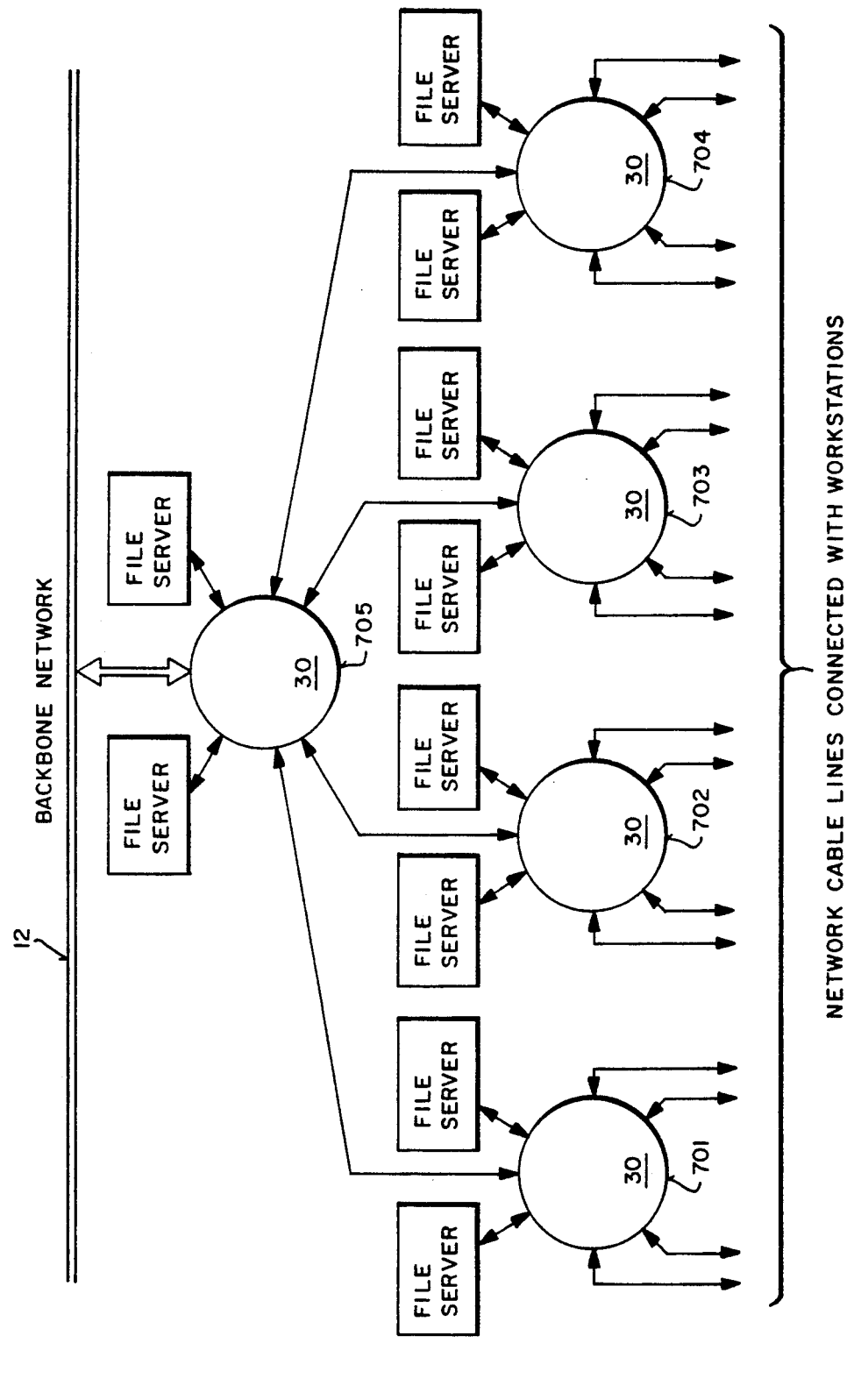
FIG_14

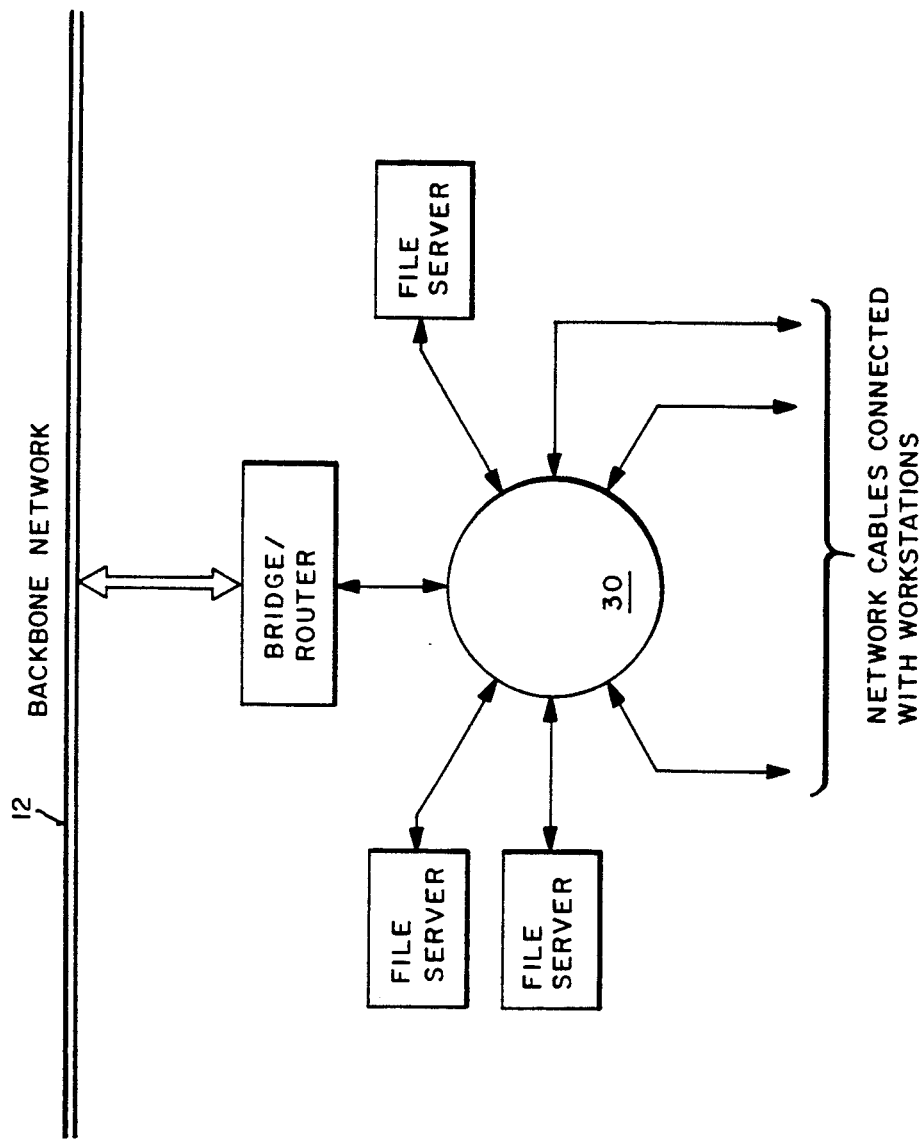

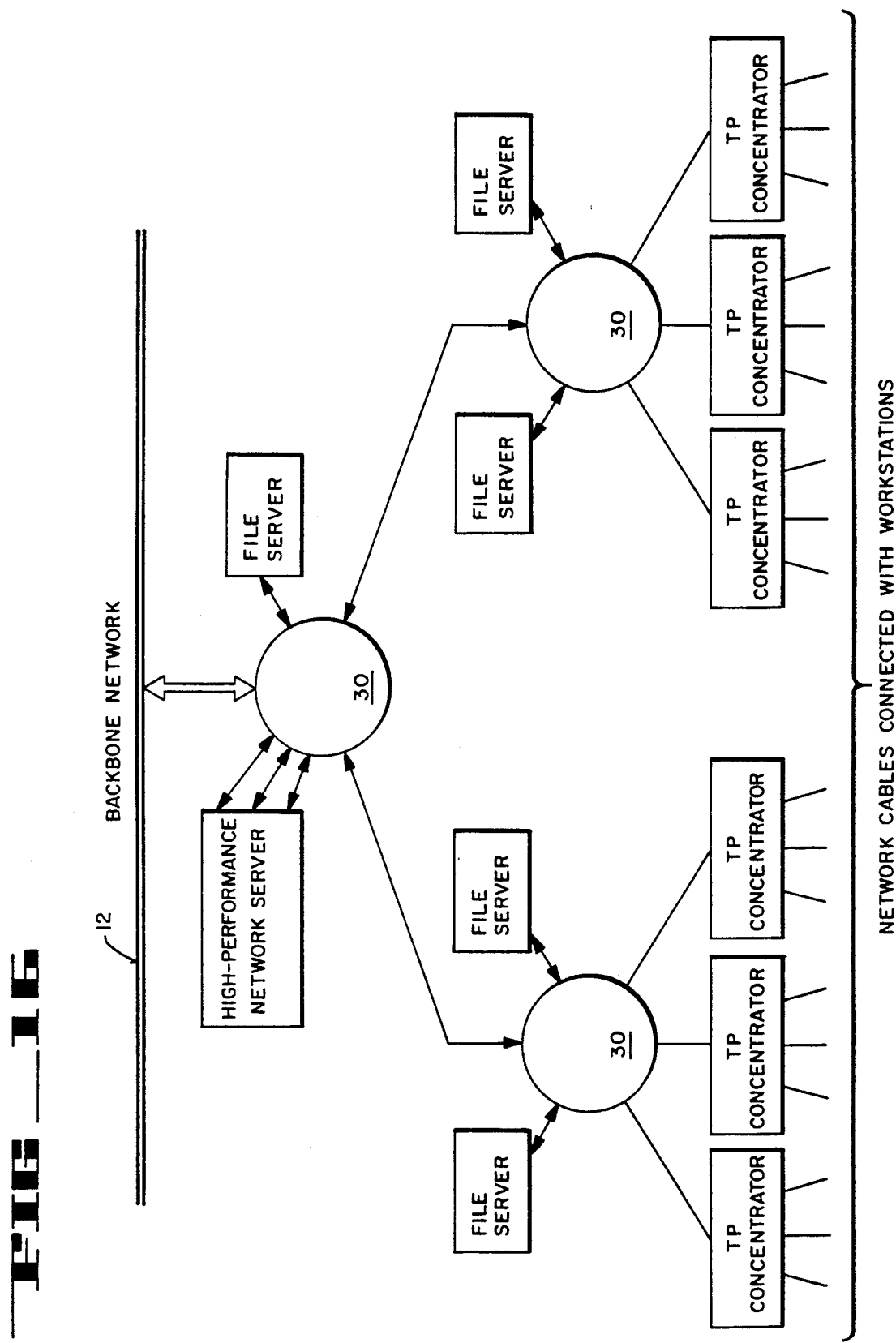
FIG_16

COMPUTER NETWORK SWITCHING SYSTEM

FIELD OF THE INVENTION

The present invention pertains to the field of computer networks. More particularly, the present invention relates to a computer network switching system.

BACKGROUND OF THE INVENTION

A typical prior art computer network allows computers in different locations to share information that would otherwise not be available to a non-networked computer. One type of prior computer network is a local area network that employs a linear bus topology for transmitting data packets. All computers within the network are connected by a single shared transmission bus. Data is transmitted as serial bit stream in packets at a one packet at a time basis along the shared transmission bus. The time-sharing network typically works fine so long as the network traffic (i.e., network data transmission) is not heavy.

An increase in data traffic often results from network expansion as more terminals are added and more powerful terminals, such as multiple file servers and high performance workstations, are installed.

One prior approach to solving this problem is to replace the existing network with a faster access speed network, such as a fiber distributed data interface ("FDDI") network. The network throughput often improves once such a high access speed network is employed.

The throughput issue, however, is often divided into two concerns. The first, total network throughput, is the amount of traffic that can be carried overall on a shared bus network. Each of the terminals on the network receives a percentage of the total throughput. The second, node throughput, is the amount of traffic that one terminal device can transmit onto and receive from the shared bus network. Faster terminal devices or continuous network users suffer on a network with limited bandwidth because they are forced to share the network.

One disadvantage of this prior approach is that the node throughput is typically not improved by the high speed network. The faster speed network typically improves the total throughput. The higher total network throughput, however, does not always translate into higher node throughput. For example, a 100 Mbit/sec. FDDI network would typically only deliver an average of 1 Mbit/sec. to each terminal of a 100 user network. As more users are added into the network, each typically receives a smaller percentage of the total throughput.

Another prior approach to solving the throughput issue is to reduce the load, rather than to increase the traffic capacity, on the network by using bridges to segment a network into smaller sub-networks. By this approach, a number of terminal devices are coupled to a multiport bridge. Simultaneous parallel data transmissions can take place in such a network.

FIG. 1 illustrates a conventional multiport bridge architecture for network 10. Multiport bridge 8 is comprised of system bus 12 coupled to system processor 11, memory 9, and two-port bridges 16, 17, and 18. Two-port bridges 16, 17, and 18 reside in expansion slots within multiport bridge 8. Bridges 16, 17 and 18 are each connected to two Ethernet TM transmission cables. For example, bridge 16 is connected to cables 19 and 20. Terminals are connected to respective cables. For example, terminal 25 is a mainframe computer connected to cable 19 and terminal 30 is a workstation connected to cable 24. The terminals send data packets to each other over the network. Each of the bridges 16, 17 and 18 in the multiport bridge system is coupled to an interconnect system bus 12. Bridges 16, 17 and 18 receive packets to and from system bus 12, respectively. The bridges then filter out the local packets that need not be transmitted and forward the packets that need to be transmitted.

A system processor 11 controls the traffic for multiport bridge 8 and does other management work. System processor 11 sends data and code to and from memory 9 via system bus 12.

Communication between two terminals within a segment can take place at the same time that communication between two terminals of different segments takes place. Thus there can be simultaneous transmission within the network. For example, data transmission from terminal 25 to terminal 26 can take place simultaneously with data transmission from terminal 27 to terminal 30.

One disadvantage associated with this prior approach is that multiport bridge 8 can sometimes cause relatively long pipeline delays. A pipeline delay is the amount of time between receipt of a packet by multiport bridge 8 and the forwarding of the packet from the multiport bridge. When a packet arrives at multiport bridge 8, multiport bridge 8 stores the packet before sending it out. This is a filtering/forwarding process. Each filtering and forwarding operation within the multiport bridge 8 does not begin until a full packet is received. The filtering and forwarding operation often requires relatively significant processing time. Time is, therefore, wasted in storing the packet, as well as in filtering and forwarding the packet. Traffic destined for other segments is thus delayed at the bridges. Only a limited packet filtering and forwarding rate can typically be obtained at multiport bridge 8.

Another disadvantage of multiport bridge 8 is the bandwidth limitation of system bus 12. If system bus 12 is a bus from a personal computer, for example, then system bus 12 might not have sufficient bandwidth to adequately handle large amounts of data that might result from numerous terminals, cables, or two-port bridges being connected to the bus 12. The bandwidth limitation of system bus 12 often is a bottleneck for network 10 as the number of ports increase, thus typically hindering system expansion.

Moreover, the use of a system bus with greater bandwidth can often dramatically increase the cost of multiport bridge 8.

Another disadvantage associated with this prior multiport bridge approach is that network segmentation resulting from connection to the multiport bridge typically eliminates the ability of any terminal node in the network to communicate freely with any other terminal node. As can be seen from FIG. 1, transmission of a data packet destined for terminals in other segments must first go through multiport bridge 8. Multiport bridge 8 forwards the packet to its destination via an input two-port bridge (such as bridge 18), the system bus 12, and an output two-port bridge (such as bridge 16).

SUMMARY AND OBJECTS OF THE INVENTION

One object of the present invention is to provide circuitry and a method for increasing the throughput of a computer network.

Another object of the present invention is to provide circuitry and a method for providing the parallelism in a computer network.

A further object of the present invention is to provide circuitry and a method for increasing the overall bandwidth of a computer network in a relatively cost-effective manner.

Another object of the present invention is to provide circuitry and a method for allowing relatively rapid packet routing from one terminal to another terminal in computer network without significant storage and forward delays.

Another object of the present invention is to provide circuitry and a method for on-the-fly routing of packets.

A network switching system is described. The network switching system comprises a first port coupled to a source, a second port coupled to a destination, and multiplexer means coupled to the first port and the second port for transferring data between the first port and the second port by selectively connecting the first port with the second port. The data is transferred from the source to the destination through the first port, the multiplexer means, and the second port. The network switching system further includes processing means coupled to the multiplexer means for assisting transmission of the data by receiving the data from the first port when the first port does not indicate a port for the destination.

A method of transferring data from a source to a destination via a network switching system is also described.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 1 is a block diagram showing a prior art computer network employing a multiport bridge;

FIG. 2 is a block diagram of a network switching system, including the multiplex logic, the packet processors, and the system processor;

FIG. 3 is a flow chart that shows the process for transmitting a packet through the network switching system;

FIG. 4 is a flow chart that shows the process for transmitting a packet by the system processor;

FIG. 5 is a circuitry block diagram that illustrates the multiplex logic employed in the network switching system of FIG. 2;

FIGS. 6A and 6B circuitry block diagrams that show one QUEUE SCAN/SELECT LOGIC of the multiplex logic of FIG. 5;

FIG. 7 is a state transition diagram for a state machine of the QUEUE SCAN/SELECT LOGIC of FIGS. 6A and 6B;

FIG. 8 is a schematic diagram of circuitry of one of the packet processors employed in the network switching system of FIG. 2;

FIG. 9 shows the filter table memory map of the packet processor of FIG. 8;

FIG. 10 shows the formation of a record stored in record section of the filter table memory of FIG. 8;

FIG. 11 shows the status field of a record of FIG. 10;

FIG. 12 shows the 9th bit of an input queue first-in first-out ("FIFO") buffer employed in the packet processor of FIG. 8;

FIGS. 13A and 13B show a flow chart that shows the process of filtering a packet in a packet processor;

FIG. 14 illustrates one application of the network switching system of FIG. 2 in a network;

FIG. 15 illustrates another application of the network switching system of FIG. 2 in a network;

FIG. 16 illustrates another application of the network switching system of FIG. 2 in a network.

DETAILED DESCRIPTION

FIG. 2 shows a network switching system 30 of a preferred embodiment of the present invention employed in a serial computer network. Network switching system provides the network with a parallel transmitting capability. The network switching system 30 includes multiplex logic 40, a plurality of packet processors 31-37 coupled to the multiplex logic, and a system processor 39. Each of the packet processors 31-37 is connected to a segment of the network.

In one embodiment, the network is a local area network. In a preferred embodiment, the network is an Ethernet TM network employing Ethernet TM transmission protocol and cabling. In alternative embodiments, the network can be of some other type, such as FDDI or Token Ring.

Network switching system 30 provides for the parallel connections among segments of the computer network. Packet processors 31-37 each connects a segment of the network. All packet processors 31-37 are connected to the multiplex logic 40. Multiplex logic 40 provides a function analogous to that of a cross point switch matrix. Simultaneous data transmissions between packet processors 31-37 can take place via multiplex logic 40 directly without any intervention of system processor 39. Route connection of an input packet processor and an output packet processor is completed before a complete packet to be transmitted is received at the input packet processor.

System processor 39 checks every packet processor other than the recipient packet processor to find out the destination address for a packet of the input packet processor if that packet does not have the correct destination address for that packet. If system processor 39 finds the destination address in one of the packet processors, the packet is sent to that packet processor by system processor 39. If not, system processor 39 broadcasts the packet to every processor except the recipient packet processor for that packet. This happens when such a packet is sent to system processor 39 by the input packet processor if the destination is unknown to the input packet processor. For example, when network switching system 30 is first powered on, no route information is contained in any of the packet processors 31-37. All information is initialized to be invalid. In this case, the packet is sent to system processor 39 in order to allow system processor 39 to find the output packet processor for the destination. System processor 39 in failing to find the destination address, broadcasts the packet to every packet processor except the recipient packet processor. When the destined terminal receives the packet broadcast by system processor 39, it signals the receipt back with a packet containing the source address of the received packet as its destination address and the destination address of the received packet as its source address. The packet is received by the output packet processor and then is forwarded to system processor 39. System processor 39 then sends the packet to the input packet processor. System processor 39 then writes the relationships between the input packet processor, output packet processor, and their respective transmitting terminals into both the input packet processor and the output packet processor. The organization of network switching system and its functions will be described in more detail below.

The layout of network switching system 30 is illustrated in block diagram in FIG. 3. Network switching system 30 includes multiplex logic 40, network interface 38, system processor 39, and packet processors 31-37.

In one embodiment, system processor 39 is a 80C186 microprocessor manufactured by Intel Corporation of Santa Clara, Calif. In alternative embodiments, other types of microprocessors can be used.

In one embodiment, network switching system 30 includes seven packet processors 31-37. In alternative embodiments, network switching system 30 may include more or fewer packet processors.

System processor 39 is coupled to multiplex logic 40 via network interface 38. System processor 39 controls the operation and management of network switching system 30. System processor 39 has its own operating system. It includes a multitasking real time kernel. The system processor 39 manages, for example, filter tables, statistics collection, network management, etc.

Multiplex logic 40 is connected to packet processors 31-37 and system processor 39 via network interface 38. Multiplex logic 40 allows simultaneous communication among packet processors 31-37 and system processor 39. For example, packet processor 31 can transmit packets to packet processor 35 via multiplex logic 40 at the same time packet processor 32 is transmitting packets to packet processor 36 via multiplex logic 40.

Multiplex logic 40 is a hardware device that requires no software intervention to perform its tasks. Its function is analogous to a cross point switch matrix. In one embodiment, multiplex logic 40 is comprised of a plurality of multiplexers. The organization of multiplex logic 40 and its function will be described in more detail below.

Each of packet processors 31-37 is coupled to a segment of the network via a transmission cable. For example, packet processor 31 is coupled to transmission cable 41. Each segment has a number of computer terminals connected to each transmission cable, thus forming the segment.

In FIG. 2, only a limited number of computer terminals are illustrated as connected to a transmission cable. For example, transmission cable 41 is shown coupled to computer terminals 110-112. In alternative embodiments, more or fewer terminals can be employed. In a further embodiment, each of packet of processors 31-37 of FIG. 2 is coupled to a single terminal.

A full duplex path exists between packet processors 31-37 through multiplex logic 40. Each of packet processors 31-37 receives a packet from another one of packet processors 31-37 via multiplex logic 40 while the processor is transmitting its own packet to another packet processor via multiplex logic 40.

Each of data packets received from network segment in network switching system 30 includes a packet header that contains a destination address and a source address. When a packet header for a packet is received at an input packet processor while the packet is still coming in, the packet header is processed by the input packet processor to establish the route of the packet to its destination via multiplex logic 40 and via an output packet processor. The output packet processor then transmits the packet to its final destination via its network cable.

For example, when terminal 120 transmits a packet to terminal 160 the packet is first received by packet processor 32 via cable 42. Packet processor 32 thus becomes the input packet processor for the packet. Routing is then performed to establish the route of the packet. Each of packet processors 31-37 include a filter table memory that stores routing information. Input packet processor 32 then accesses its filter table memory (shown in FIG. 9) with source and destination address in the packet. This is referred to as filtering operation. The output packet processor could be, for example, packet processor 36. The route between input packet processor 32 and output packet processor 36 is established via multiplex logic 40. When output packet processor 36 receives the packet, it forwards the packet to terminal 160 via cable 46.

When system 30 is first powered on, no routing information is included in any of packet processors 31-37. All information in all filter table memory of all processors 31-37 is initialized by system processor 39 to be invalid. The routings are built up with every transmission thereafter.

Each of packet processors 31-37 includes an input buffer and output buffer. If the output packet processor is busy receiving another packet after the route of this packet is set up, the packet is buffered in the input packet processor. If the cable of the network segment to which the output packet processor is connected is busy transmitting, the packet is buffered in the output packet processor. For example, in the situation described above, if output packet processor 36 is busy receiving another packet from other packet processor, the packet is buffered within input packet processor 32. If cable 46 is busy with a transmission, the packet is buffered in output packet processor 36.

Each of the packets includes a packet header that contains a source address and a destination address. Corresponding to the destination address and source address, the input packet processor stores a record containing a system header. The system header is appended to the packet before the packet is transmitted. The system header includes port of entry information with respect to the source address of the packet. The system header also includes port of exit information with respect to the destination address of the packet. The route between the input packet processor and the output packet processor is established when the system header is appended to the packet. The organization of a packet processor and its function will be described in more detail below.

System processor 39 does not intervene during the process of transmitting a packet from one packet processor to another via multiplex logic 40. System processor 39 only receives packets that require certain operations of system processor 39. System processor 39 receives its packets via network interface 38. A packet without its properly routed system header is forced to system processor 39. A trace packet is also forced to system processor 39. A trace packet is appended with a valid system processor system header. When a trace packet is received by system processor 39, it forwards the packet to the output packet processor. In the meantime, system processor 39 recovers network management information or relevant information from the packet.

When a proper system header with port of entry or port of exit addresses at both is not found, or the destination address or source address of the packet does not match with the record stored in packet processor (such as in the case when network switching system 30 is first powered on), the packet is appended with a system processor system header and the packet is sent to system processor 39. System processor 39 first checks whether the source address exists in the network and whether the source address exists at the correct port of entry. If the source address does not exist in the port of entry packet processor, then system processor 39 recovers the information from the source address in the packet and updates the filter table memory in the input packet processor (port of entry) with the information. If the port of entry is not marked in the current input packet processor as local system processor 39 updates the filter table memory of the related packet processors. For example, if terminal 120 is removed from cable 42 and connected to cable 45, system processor 39, however, sees the port entry for terminal 120 at packet processor 32 as local. System processor 39 sees the port of entry for terminal 120 of packet processor 35 as remote. System processor 39 then changes the port of entry of terminal 120 in the filter table memory of packet processor 32 and packet processor 35.

If the destination address for a packet does not exist in all of packet processors 31-37, system processor 39 sends the packet to all terminals coupled to all packet processors 31-37. When the destined terminal receives the packet broadcast by system processor 39, it signals the receipt back with another packet containing the source address of the received packet as its destination address and the destination address of the received packet as its source address. The packet is received by the output packet processor and is then forwarded to system processor 39. System processor 39 then sends the packet to the input packet processor. System processor 39 then writes the relationships between the input packet processor, output packet processor, and their respective transmitting terminals into both the input packet processor and the output packet processor. This process of system processor 39 is referred to as the process of learning. The process of learning is part of initialization of the system. When system 30 is first powered on, no routing table is stored in the filter table memory of any one of packet processors 31-37. All routing must be built up in the filter table memory of all packet processors 31-37 through this process of learning. The process of learning by system processor 39 will be described in more detail below.

Network interface 38 receives the packets that are marked to send to system processor 39 via multiplex logic 40 and transmits the packets to system processor 39. Network interface 38 also transmits packets from system processor 39 onto an output packet processor or packet processors via multiplex logic 40. Network interface 38 also includes a cyclic redundancy check ("CRC") function to check all received packets. All packets coming into system processor 39 are checked for CRC in the network interface 38. Further, any packet transmitted from network interface 38 may be appended with the CRC by system processor 39. This CRC check is to avoid the possibility of corrupted packets being used to form filter table in network switching system 30.

System processor 39 of network switching system 30 has a function of keeping track of terminals coupled to their respective packet processors 31-37. If a terminal to a packet processor ceases to have communication with its packet processor, system processor 39 removes the entry of the terminal in filter table memories of packet processors 31-37. For example, if packet processor 35 does not receive packets from terminal 152 for a specified period of time, system processor 39 removes the address of terminal 152 in the filter table memory of all packet processors 31-37. In this way the filter table memory for all packet processors 31-37 is maintained refreshed.

Network switching system 30 has the ability to transmit packets without fully buffering the packets in the system. Packets are forwarded to the appropriate output packet processor based on the contents of the packet headers, each of which contains the source and destination address for that packet. The route is established and packet transmission starts before the packet is fully received in the input packet processor. This is referred to as on-the-fly routing.

FIG. 3 is the flow chart that illustrates a process for network switching system 30 of FIG. 2. In FIG. 3, network switching system 30 is powered on at step 50. At step 51, one of packet processors 31-37 receives a packet from a network segment. This packet processor is referred to as the input packet processor for the packet. Simultaneous reception of packets in other processors of packet processors 31-37 may happen in network switching system 30 as well.

At step 52, the received packet is checked in the input packet processor to see if a routing table is set in the input packet processor. The routing table is a record stored in the input packet processor. The routing table includes information about port of entry and port of exit for the packet. The port of exit information indicates the output packet processor that will (1) receive the packet from the input packet processor and (2) transmit the packet out to its final destination. When system 30 is first powered on, no routing table will be found. If the routing table for the packet can not be found in the input packet processor at step 52, the route between the input packet processor and the output packet processor is not established. The packet is then sent to system processor 39 from the input packet processor via multiplex logic 40 and network interface 38 at step 55 to set up the routing table and transmit the packet to its final destination.

System processor 39 then starts its learning process to establish the route for the packet. First, system processor 39 checks the filter table memory in all packet processors 31-37 at step 56 to find the output packet processor with the destination address. If system processor 39 finds in a filter table memory the output packet processor with the destination address, then system processor 39 transmits the packet to the output packet processor via multiplex logic 40 at step 60. If system processor 39 does not find in any filter table memory the output packet processor with the destination address, then system processor 39 broadcasts the packet by sending the packet to every one of packet processors 31-37 except the input packet processor that forwards the packet to system processor 39. This is accomplished at step 57. At steps 58-59, the destination terminal signals back to the output packet processor that the destination terminal has received the packet. This is done by having the destination terminal send to the output packet processor another packet. System processor 39 receives the packet sent by the destination terminal and forwards that packet to the input packet processor. System processor 39 then established a routing table in both the input and output packet processors. That routing table is, therefore, established for use in subsequent transmissions.

If a routing table is found at step 52, the route is then established at step 53 between the input packet processor and the output processor via multiplex logic 40. At step 54, the packet is transmitted from the input packet processor to the output packet processor via the established route. During the transmission of the packet, multiplex logic 40 is able to connect other packet processors for parallel packet transmission in network switching system 30.

At step 61, system 30 checks if any incoming packet is received at any one of packet processors 31-37. If so, the process is repeated. If not, system 30 goes into a waiting state.

FIG. 4 shows the flow chart of the learning process by system processor 39 in FIG. 2. In FIG. 4, the packet is received in system processor 39 from one of packet processors 31-37 at step 90. Before sending out from its input packet processor, every packet is appended with a system header. The system header is part of the routing table. The system header includes the port of entry and port of exit information of the packet. The system header is appended to the packet after a filtering operation processor is completed. The filtering operation looks for the routing table of the packet. If a proper routing table is not found in the input packet processor or the routing table for the packet does not exist, the packet is appended with a system processor system header.

System processor 39 first checks if the source address exists correctly in the input packet processor at step 91. This is accomplished by checking the port of entry information in the system header with the source address in the packet. If the source address does not exist in the input packet processor, system processor 39 updates of the input packet processor by writing the port of entry corresponding to the source address into the filter table memory of the input packet processor at step 92. System processor 39 then checks whether system processor 39 knows the output packet processor of the packet at step 93. This is achieved by checking the memory of system processor 39. For example, assume the destination address of the packet is terminal 150. System processor 39 learns processor 35 is the output packet processor for the destination address of terminal 150 by reading the filter table memory of packet processor 35.

If system processor 39 does not find the port of exit information corresponding the destination address at step 93, system processor broadcasts at step 94 the packet to all but the input packet processor of processors 31-37. At steps 95 and 96, the destination terminal signals back. This is done by the destination packet sending a packet to the output packet processor. The output processor then sends that packet to system processor 39. System processor 39 then forwards that packet back to the input processor. The route is then established and system processor 39 writes the route in the filter tables of both input and output packet processors.

If, at step 93, system processor 39 knows the output packet processor, the packet is then forwarded to the output packet processors at step 97.

FIG. 5 is a block diagram of the circuitry of multiplex logic 40. In FIG. 5, multiplex logic 40 includes QUEUE SCAN/SELECT LOGIC 0 through 7 corresponding to packet processors 31-37 and network interface 38. Each QUEUE SCAN/SELECT LOGIC 0 through 7 is connected to one of packet processors 31-37 and network interface 38, respectively. For example, QUEUE SCAN/SELECT LOGIC 0 is connected to network interface 38 and QUEUE SCAN/SELECT LOGIC 1 is connected to packet processor 31.

Each of QUEUE SCAN/SELECT LOGIC 0 through 7 receives signals from packet processors 31-37 and system processor 39. The signal include ADD_OUT signal, XMIT_DATA signal, and XMIT_DATA_VALID signal. Each of QUEUE SCAN/SELECT LOGIC 0 through 7 also includes a START_XMIT signal that is to be applied to all of packet processors 31-37 and network interface 38. These signals are referred to as transmit signals of multiplex logic 40.

The ADD_OUT signal provides the destined port of exit value of the packet, if the route is established for the packet in an input packet processor or system processor 39. This signal is a serial signal and remains deasserted if no packet is available for transmission. The transmission interval for all the ADD_OUT signals is divided into 16 bit periods. Each bit period is designated for each of the packet processors 31-37 and system processor 39. The rest of the bit periods are reserved. For example, a packet from packet processor 37 for transmission to packet processor 35 will assert the ADD_OUT signal line for QUEUE SCAN/SELECT LOGIC 5 during bit period 5 and deassert the signal during the rest of the period. A broadcast packet of packet processor 37 which has to be sent to packet processors 31-36 will have the line asserted throughout the period except for bit period 7. The ADD_OUT signal provides a mask bit for the packet processor to which the packet is to be sent. Multiplex logic 40 ensures that the packet is synchronously transmitted to all the output packet processors.

The XMIT_DATA signal carries the packet data when the XMIT_DATA_VALID signal is asserted.

The START_XMIT signal is a handshake signal from multiplex logic 40 requesting an input packet processor or the network interface 38 to start sending the packet over the XMIT_DATA line.

Each of queue scan/select logics 1 through 7 includes a RCV_DATA output and a RCV_DATA_VALID output to its respective one of packet processors 31-37. Queue scan/select logic 0 includes a PKT_RDY output and a handshake SEND_PKT input signal from network interface 38, besides RCV_DATA and RCV_DATA_VALID outputs to network interface 38.

The RCV_DATA signal on one of queue scan/select logics 1 through 7 transmits a packet to the respective packet processor. The transmission starts as soon as the RCV_DATA_VALID signal is asserted on from the same queue scan/select logic.

QUEUE SCAN/SELECT LOGIC 0 asserts the PKT_RDY signal to network interface 38 whenever a packet is available from one of packet processors 31-37 and is destined for system processor 39. The network interface 38 needs not know about origin of the packet. If network interface 38 is ready to receive a packet after it senses the PKT_RDY signal from queue scan/select logic 0 then it asserts the handshake SEND_PKT signal to queue scan/select logic 0 to allow multiplex logic to start sending the packet.

Multiplex logic 40 also includes a serial bus status/timing logic 200. Logic 200 is applied with the START_XMIT signal, the ADD_OUT signal and a WORD signal. Logic 200 outputs a BUS_FREEZE signal, a BROADCAST PORT # signal, PORT_STROBES signals one for each packet processor, a BUS_QUIET signal and a BUS_FREE signal to all of QUEUE SCAN/SELECT LOGIC 0 through 7. The BUS_FREEZE signal is a request signal that requests to freeze all the transmit buses for receiving a broadcast packet. The BROADCAST_PORT # signal indicates which one of packet processors 31-37 is requesting a broadcast. The PORT_STROBES signals are the timing signals for each of QUEUE SCAN/SELECT LOGIC 0 through 7 for sensing the address and the ADD-OUT lines. The BUS_FREE signal is generated by examining the ADD_OUT signal on all of QUEUE SCAN/SELECT LOGIC 0 through 7. If all the lines remain deasserted for the whole 16 bit period, the signal is generated. This means there is no packet at any of packet processors 31-37 and system processor 39 for transmission over multiplex logic 40. The BUS_QUIET signal has to be asserted after the BUS_FREEZE signal has been asserted. The BUS_QUIET signal indicates that a broadcast transfer is about to start and all packet processors 31-37 (except the input packet processor) must be ready to receive the packet. The BUS_QUIET signal is asserted by checking the START-XMIT signal from all QUEUE SCAN/SELECT LOGIC 0 through 7. The BUS_QUIET signal is asserted if all the START_XMIT lines are deasserted after the assertion of the BUS_FREEZE signal.

Each of QUEUE SCAN/SELECT LOGIC 0 through 7 sequentially scans each of packet processors 31-37 and network interface 38 by looking at each of the ADD_OUT lines during a specific bit period. This is to detect if a packet is available at any one of packet processors 31-37 and system processor 39. For example, QUEUE SCAN/SELECT LOGIC 1 scans the ADD_OUT lines from network interface 38 and packet processors 31-37. If a packet is not available at one of its ADD_OUT line, QUEUE SCAN/SELECT LOGIC 1 goes to scan the next processor until a packet is available from one of packet processors 31-37 and system processor 39.

When QUEUE SCAN/SELECT LOGIC 1 finds that a packet is available from a packet processor, for example, from packet processor 31, QUEUE SCAN/SELECT LOGIC 1 must start the transfer from packet processor 31 to its own port, in this case, network interface 38. This is accomplished by connecting the XMIT_DATA signal from the input packet processor to the RCV_DATA line of QUEUE SCAN/SELECT LOGIC 1 through its data selector (not shown). If the input processor is system processor 39, QUEUE SCAN/SELECT LOGIC 1 waits until the SEND_PKT signal is asserted to it. The QUEUE SCAN/SELECT LOGIC 1 asserts the START_XMIT signal to network interface 38. The XMIT_DATA_VALID signal from the input processor is also connected to the RCV_DATA_VALID signal of QUEUE SCAN/SELECT LOGIC 1 using its data selector. The START_XMIT signal remains asserted as long as the packet transmission is not completed. Once the data transfer is completed, QUEUE SCAN/SELECT LOGIC 1 then goes to scan the next processor.

Each of QUEUE SCAN/SELECT LOGIC 0 through 7, therefore, sequentially monitors the ADD_OUT signal of each of packet processors 31-37 and system processor 39 to see if a packet is ready for it. The serial scanning takes 100 ns per processor. A scan counter is provided to increment at every 100 ns until a packet is found in a processor.

If a packet being transferred is a broadcast packet that is meant to be sent to all packet processors 31-37 except the input packet processor, simultaneous transfers by all QUEUE SCAN/SELECT LOGIC 0 through 7 to their respective processors take place. Therefore, it is important that all QUEUE SCAN/SELECT LOGIC 0 through 7 are ready to receive the broadcast packet.

When a broadcast packet appears in one of packet processors 31-37 and system processor 39, the BUS_FREEZE signal is asserted. Also the BROADCAST_PORT # signal is asserted to indicate the packet processor that is waiting to transfer a broadcast packet. All QUEUE SCAN/SELECT LOGIC 0 through 7 stop scanning and prepare to receive the broadcast packet after completion of its current transfer. The packet processor transmits the broadcast packet to multiplex logic 40 after the BUS_QUIET signal is asserted.

FIGS. 6A and 6B show the circuit diagram of one of the QUEUE SCAN/SELECT LOGIC 0 through 7. FIGS. 6A and 6B show QUEUE SCAN/SELECT LOGIC 200. In FIGS. 6A and 6B LOGIC 200 includes a programmable array logic ("PAL") state machine 200, a counter 205, and an 8-bit register 201, etc.

The state diagram of state machine 204 is shown in FIG. 7. State machine 204 controls the scanning of each of the input packet processors to see if any of them has a packet to be delivered to the output packet processor to which QUEUE SCAN/SELECT LOGIC 200 is connected. The bits of counter 205 select the port to be scanned. Counter 205 can be incremented by the scan logic state machine 204.

The ADD_OUT lines from all packet processors 31-37 provides as a register 201. Register 201 is clocked by a STR-PTG. Each of QUEUE SCAN/SELECT LOGIC 0 through 7 is strobed in a different bit period. For example LOGIC 6 in FIG. 5 is strobed in bit period 6 while LOGIC 3 is strobed in bit period 3. This is necessary because the ADD_OUT signal is a serial address signal as described. The signal is asserted in one of the 16 bit intervals synchronized to a common word signal used by all QUEUE SCAN/SELECT LOGIC 0 through 7.

Register 201 therefore contains information about the input packet processors that have a packet available for the packet processor to which LOGIC 200 is connected. When input packet processors have a packet for LOGIC 200, a bit at the output of counter 201 is zero for these packet processors.

The output bits of scan counter 205 select one of the bits from the output of 201 to appear at the output of one of eight data selectors 202.

State machine 204 can read the output signal from data selector 202 marked My_pkt to find out if a packet is available to it from the packet processor being selected by scan counter 205. If there is no packet from packet processor (My-Pkt is false), then scan counter is incremented using the SCAN_LAN6 signal to counter 205.

Scan counter 205 is incremented till a packet is found from the packet processor being scanned. If the packet is found, scan counter 205 stops counting and the signal SCAN_LAN6 is de-asserted. And a signal START_XMIT is asserted on the signal lines corresponding to the packet processor where scan counter 205 is just stopped. This is done by a data multiplexer logic 207. Data multiplexer logic 207 simply asserts the ST_XMIT line corresponding to the selected output packet processor. This is a handshake signal to the input packet processor which has a packet for the output packet processor. At the same time, data selectors 203 and 208 respectively connect the XMIT_DATA and RCV_VALID signals of scan counter 205.

Having asserted the handshake signal, state machine 204 waits for the RCV_VALID signal to be asserted which happens as soon as the selected packet processor starts transmitting the data after receiving the handshake signal ST_XMIT. State machine 204 is now in state 2 at port 252 (see FIG. 7) waiting for the packet transmit to finish. When that happens, the RCV_VALID signal is deasserted and state machine 204 returns to state 0 at pointer 250 (see FIG. 7) ready to scan the next input packet processor.

Thus all the packet processors 31-37 are sequentially scanned for packets. There is, however, an exception of the multi-cast packets which are to be synchronously transferred to multiple packet processors. In this case, LOGIC 200 must pick up the packet from the input packet processor to multi-cast the packet.

In this case, each packet processor that has a packet that is to be delivered to multiple packet processors must assert the BUS-FREEZE which forces a broadcast port counter to stop. The bits BA1, BA2 and BA3 are the bits of this counter as shown in this figure. The BUS_FREEZE signal also brings state machine 204 to state 3 at pointer 253 (see FIG. 7) once these having completed its current transfer in state 2 at pointer 252 and having returned to state 0 at pointer 250. At state 3 the broadcast address from broadcast Port# counter is loaded into register 207. Further the data selector 206 selects the inputs from register 207 rather than counter 205. In this way the packet processor to which LOGIC 200 is connected is now the broadcast packet processor. Once the current transfer through QUEUE SCAN/SELECT LOGIC 0 through 7 is completed, the broadcast processor gets the signal BUS_QUIET as described, which signals this processor to assert the ADD_OUT signal for a full 16 bit period which is synchronized to the WORD signal in relevant bit period. The ADD_OUT signal as described above, is asserted during each bit period corresponding to the destination packet processor to which this multi-cast packet may be sent. LOGIC 0 through 7 which a packet for them will see the signal MY_PKT and move to state 4 at pointers 254 (see FIG. 7) waiting for RCV_VALID to be asserted. LOGIC 0 through 7 that do not have a packet for them return to state 0 at pointer 250 as soon as the BUS_FREEZE signal is deasserted by the transmitting packet processor. Thus all the relevant LOGIC will start synchronously receiving the packet on their RCV_DATA and RCV_VALID lines. At the end of the RCV_VALID, the queue scan select state machine 204 returns to state 0 at pointer 250 to scan packet processors 31-27 using scan counter 205.

FIG. 8 is a block diagram of the circuitry of one of packet processors 31-37 shown in FIG. 2. FIG. 8 shows packet processor 300. In FIG. 8, transceiver 301 of packet processor 300 is connected to a network cable 329. Network cable 329 is a serial transmission cable and simultaneous data transmission and reception can not take place at transceiver 301 via cable 329. When a packet is applied to transceiver 301 via cable 329, the packet is applied to SIA (Serial Interface Adaptor) 302 via an AUI (Access Unit Interface) cable 330. The packet is then coupled to input queue FIFO buffer 310 via receive logic 303, data bus 320, and input control logic 304. The packet, when received at SIA 302, contains a standard network preamble. The standard network preamble is stripped off of the packet in receive logic 303 before the packet is forwarded to input queue FIFO buffer 310.

The packet received includes a packet header with source and destination address information in it. The packet header of the packet is sent to scratch pad memory 304 and to hash compute logic 331 where a hash function computation is performed. Hash compute logic 331 performs a hash operation on the address data received. The address data is sent serially to hash compute logic 331 via parallel/serial converter 332. The computation is performed as the serial data bits are serially coming into logic 331. The hash computation is completed as soon as all 48 bits are received. Thus, 12 bit hash values, one for source and one for destination, are completed. The 48 bit destination address or source address is converted into a 12 bit hash value. The purpose of the hash computation is to shorten the address and to accelerate the filtering process.

In a preferred embodiment, the hash computation is performed by encrypting four bits into one bit using the NOR gates, thus obtaining the 12 bit hash value. For example, bit 1 and bit 13 of the address are applied to an exclusive OR ("XOR") gate, the output is then applied to another XOR gate with bit 25, the output is then applied with bit 37 to a third XOR gate. In this way, the first bit of the hash value is obtained. Similarly, bit 2 is applied to a XOR gate with bit 14, the output is then applied to another XOR gate with bit 26, its output is applied to third XOR gate with bit 38 to form the second bit of the hash value. Bit 12 of the hash value is framed by grouping bit 12 with bit 24, with bit 36, and with bit 48.

Both the hash values are then applied to filter logic 305 via bus 321. Then, a filtering to operation is performed to set up the route for the packet. Filter logic 305 first addresses filter table memory 306, using the hash value, for a hash anchor which contains a pointer. The pointer then leads to a record (hash bucket) that includes the system header to be appended to the packet stored in input queue FIFO buffer 310. Buffer 310 is a first-in first-out buffer. The system header is stored in filter table memory 306. The system header contains port of entry and port of exit information corresponding the source and destination addresses of the packet header of the packet. The port of entry field of the system header indicates the input packet processor that receives the packet. The port of exit of the system header indicates the output packet processor to be used to transfer the packet to its final destination. The system header is found by performing a filtering operation in the input packet processor. The system header is then appended to the packet and the route is thus established between the input packet processor and the output packet processor. The system header is transparent to the network user because the system header is being stripped off at the output packet processor before the packet is being transmitted out from the output packet processor to its final destinations.

Filter table memory 306 of packet processor 300 stores all kinds of system headers, including predefined system headers and regular system headers. Predefined system headers include system processor system header, reject system header, and broadcast system header. Predefined systems headers are stored in different section of filter table memory with regular system header.

System processor system header is appended to the packet whenever the packet is required to be transmitted to system processor 39 for various reasons. Reject system header is appended to the packet if the packet is determined to be a local packet that requires no transmission in network switching system 30. A local packet is a packet that is transmitted from a terminal to another terminal within the same network segment. Packet processor 300 receives any packet transmitted on a network segment cable, and determined then whether it is a local packet or a remote packet. When a reject system header is appended to a packet, packet processor 300 rejects the packet.

Broadcast system header is a broadcast header for the packet. A broadcast system header is appended to the packet by the input packet processor if the destination address field is a broadcast address, the packet is sent to all packet processors except the input packet processor that broadcasts the packet. It should, however, be noted that this broadcast is different from the broadcast by system processor 39. Here, the packet is sent to every other packet processor without going into system processor 39 first. System processor 39 broadcasts a packet even if it does not have a broadcast destination in its header, when the location of the destination is unknown.

Referring back to the filtering operation, if the system header corresponding to the source and destination address is found in filter table memory 306, filter logic 305 picks up the system header via bus 323 and applies it to input queue FIFO buffer 310. The system header is then appended to the packet. The proper route is then established and the packet is transmitted to its destined output packet processor via serial bus transmit lines 313, and via multiplex logic 40 of FIG. 2. Output control logic 311 controls the transmission of the packet onto serial bus transmit lines 313 under the control of FILTER DONE signal. The FILTER DONE signal is asserted to both input control logic 309 and output control logic 311 when the filtering operation to find the system header is completed.

If, on the other hand, filter table memory 306 fails to contain the proper system header that includes both proper port of entry and port of exit information, then the packet is marked for system processor 39. A system processor system header is appended to the packet at input queue FIFO buffer 310 to forward the packet to system processor 39 via serial bus transmit lines 313. The port of entry in the system header is also marked so that system processor 39 knows the port of origin for this packet. If, for various reasons, such as trace source/destination, the packet is required to be forwarded to system processor 39, the system header found will be so marked that the packet is sent to system processor 39.

If, during the filtering operation, packet is determined for broadcast to every one in network switch system 30, a broadcast system header is appended and the packet is sent accordingly, the packet is found a local packet, a reject system header is appended and the packet is rejected without any transmission.

For input queue FIFO buffer 310, a bit is used to indicate the end of a packet. In a preferred embodiment, the 9th bit of a byte in a packet is employed to indicate if the byte is the last byte of a packet. If the 9th bit is logical zero, it means the byte is not the last byte of the packet. If a logical one is found in the 9th bit of a byte, the last byte of packet is reached.

Filter table memory 306 is updated by system processor 39 via parallel bus interface 307 and via bus 324. As described above, when filter table memory 306 does not have a record corresponding either the destination address or source address, the packet is marked for system processor 39 in order to enable system processor 39 to find the port of entry or port of exit. System processor 39 then writes the proper information into filter table memory 306 after the routing is found. A routing table is then established on the destination address or source address in filter table memory 306.

Packet processor 300 also includes an output queue FIFO buffer 316. Output queue FIFO buffer 316 receives incoming packets from other packet processors within network switching system 30 via multiplex logic 40. Output queue FIFO buffer 316 receives the incoming packets via serial bus receive lines 314, and via input control logic 315. Packets stored in output queue FIFO buffer 316 are applied to SIA 302 for transmission to their final destinations via bus 326, and via packet framer 319. The packets in buffer 316 are outputted under a first-in first-out basis. Output control logic 317 control the transmission of the packets in buffer 316 to packet framer 319 via bus 326. Output control logic 317 is, however, under the control of network controller 318 which must transmit packets according to the network access protocol. Before issuing a control signal to output control logic 317, network controller 318 checks with SIA 302 to find out if transceiver 301 is receiving a packet from network cable 329. As described above, parallel transmission on network cable 329 is not permitted. The packet must be set on the cable based on this network access protocol and its function is performed by the network controller 318.

At packet framer 319, the system header of a packet received in packet processor 300 is stripped off before the packet is forward to SIA 302. In doing so, the system header is transparent to the network user and the packet length and formation remain unchanged. In an embodiment where the Ethernet TM network standard is employed, the standard preamble is also put back onto the packet being applied to SIA 302. The standard preamble is same for all packets in the network.

Packet processor 300 includes a loop back mode. In the loop back mode, a packet in output queue FIFO buffer 316 is routed via SIA 302, receive logic 303 to input queue FIFO buffer 310. The mode is generated by applying a LOOPBACK signal to mode control logic 341. Control port 308 generates the LOOPBACK signal. The LOOPBACK signal is applied to mode control logic 341 and SIA 302. Mode control logic then applies a DIS_RCV signal to input control logic 309 via line 327. The DIS_RCV signal controls input control logic 309 to disable the receiving function when transmitting except in the loopback mode. SIA 302, when receiving the packet form buffer 317 via packet framer 319, applies the packet to receive logic 303. The packet is then routed to input queue FIFO buffer 310. The receiving function of SIA 302 from transceiver 301 via AUI cable 330 is temporarily disabled by the LOOPBACK signal in the loopback mode.

Control port 308 of packet processor 300 includes a rest signal. When network switching system 30 is first powered on, system processor 39 initialize filter table memory 306 to be invalid. At this moment, system processor 39 controls control port 308 to issue the reset signal to reset all components of packet processor 300 not to receive any packet. When the initialization is done, the reset signal is deasserted.

FIG. 9 shows the memory map 400 of filter table memory 306. In FIG. 9, section 401 of memory map 400 contains predefined system headers. The predefined system headers are broadcast system headers, reject system headers (for local packets), and system processor system headers. Each header is 12 bytes in width. Next is the global statistics counters 402. The statistics counters count various status during the filtering operation. Next is the load distribution table 403. The load distribution table 403 is the reserved section for other purpose. Then a 32 byte record section 404 is included in memory map 400. The records (called HASH BUCKETS) stored in this section include records corresponding to destination addresses and source addresses. The pointers (called HASH ANCHORS) for the records are stored in hash table 405 which is located next to it. Hash table 405 has 4K entries that store pointers. Each pointer is 2 byte in width and is pointing to a 32 byte record contained in record section 404. In one embodiment, the total memory capacity of filter table memory 306 is 64K bytes.

FIG. 10 shows the formation of a record stored in the record section 404 of filter table memory 306. In FIG. 10, record in record section 404 includes host address field 500, pointer link field 501, status field 502, port of exit mask filed 503, reserved field 504, port of entry field 505, type field 506, software pointer field 507, and packet counter field 508. Port of exit mask 503, reserved field 504, port of entry 505, and type field 506 form the system header that is appended to a packet after the filtering operation of the packet is done. In one embodiment, reserved field 504 is a field reserved for future expansion or for other purposes.

Host address field 500 contains a host address corresponding to a destination address or a source address. Pointer link filed 501 stores a pointer pointing to another record. Since hash function computation is employed to form a pointer, there may be a number of records having same hash value. Therefore, the function of pointer link field 501 is to link all records under the hash value together. The search for a record is record section 404 is thus a chained addressing. Status field 502 stores the status of the record.

Port of exit mask field 503 indicates the input packet processor that receives the packet from its network segment. Port of entry field 505 indicates the output packet processor number on which the record exits. Type field 506 is used for diagnostic purpose, or for future purpose. Type field 506 indicates whether the packet is for network management, etc. Software pointer 507 links all active records in record section 404 together. Packet counter field 508 is a counter for this source address.

FIG. 11 shows the formation of status field 502. In FIG. 11, valid bit 510 indicates if the record is valid or not. Whenever network switching system 30 is powered on system processor 39 initializes filter table memory 306 to contain only system processor system header so that all packets are set to system. Packet processors 31-37 are initialized by system processors 39. Therefore, the record is invalid as nothing is stored in it. The header according to the record is then directed to system processor 39 for broadcasting.

Remote/local bit 511 indicates whether the record for a local packet or a remote packet. TRACE_DESTINATION bit 812 and TRACE_SOURCE bit 513 indicate whether the destination or source needs to be traced. If so, the packet is forced to be sent to its destination via system processor 39.

Broadcast_route bit 514 indicates the header is to be broadcast routed and the packet is sent via multiplex logic 40 to all packet processors 31-37, except the one sending the packet.

Sample source bit 515 is set for statistics purpose. If it is set, the source address is stored in a particular location in global statistics counters section 402. System processor 39 samples the counters 402 to find out which terminal is communicating with which terminal. When the source address is written into the counters 402, the bit 515 is reset.

Section 516 is a reserved section in status field 802. In one embodiment, the reserved section 516 is reserved for future use.

FIG. 12 illustrates the ninth bit scheme in input queue FIFO buffer 310 of FIG. 8. In FIG. 12, input queue FIFO buffer 310 is divided into 2K sections, each storing a packet. The width of input queue FIFO buffer 310 is 9 bits, with 8 bit forming a byte. The 9th bit is an added bit, for determining the end of a packet stored in a 2K section of input queue FIFO buffer 310.

Given that each packet is of variable length, every 2K section of input queue FIFO buffer 310 may have some space unoccupied by a packet. A packet may also occupy the entire 2K section. For example, PACKET A occupies 1512 bytes of a 2K section. If no identification is employed to indicated the end of a packet, the 2K section will have to be transmitted in order to transfer the packet. The 9th bit is thus employed to indicate the end of a packet. The 9th bit is in one state when its byte is not the last byte of the packet, and will be in the other state when its byte is the last byte of the packet. The 9th bit is not to be transmitted to multiplex logic 40.

In one embodiment, the 9th bit is always a logical zero when its byte is not the last byte of the packet. When the byte is the last byte of the packet, the 9th bit is a logical one.

In an alternative embodiment, the 9th bit is always a logic one when its byte is not the last byte of the packet. When the byte is the last byte of the packet, the 9th bit is logical zero.

Input control logic 309 includes an input counter 501. In one embodiment, the width of input counter 501 is 11 bits. Input counter 501 indicates the number of the incoming packets. When input queue FIFO buffer 310 receives a packet from one of its terminals, the input counter 501 is incremented.

Output control logic 311 includes an output counter 502. In one embodiment, the output counter 502 is 11 bits wide. Output counter 502 indicates the number of the outgoing packets. Before input queue FIFO buffer outputs a packet, the content of output counter 502 is compared with the content of input counter 501. If the content of output counter 502 is greater than that of input counter 501, it means there are packets in buffer 310 waiting to be transmitted. The first in packet then is transmitted out. If not, it means no packet is waiting in buffer 310 for transmission.

FIGS. 13A and 13B illustrate the flow chart of the filtering operation of packet processor 300 of FIG. 8. The filtering is performed on packets coming into input queue FIFO buffer 310 from the network segment to which packet processor 300 is connected. The filtering operation is performed on packets coming into input queue FIFO buffer 310 from the network segment. Packets received from multiplex logic 40 and to be transmitted out to the network segment do not require any filtering.

In FIGS. 13A and 13B step 600 indicates that packet processor 300 is waiting for a packet to appear at its input queue FIFO buffer 310. When the DATA VALID signal is received at input queue FIFO buffer 310, packet processor 300 counts a time period to receive 12 bytes of a packet at step 601. At this moment, packet processor 300 applies the first received 12 bytes of a packet to scratch pad memory 304 and to hash compute logic 331. The hash computing is performed in hash compute logic 331. The first 12 bytes are the packet header of a packet which contains the source and destination address of the packet. Step 602 checks if the DATA-VALID signal disappears during the time of receiving the first 12 bytes of a packet. If so, the packet is regarded as a short packet and the process exits to node 3. If the packet is determined not to be a short packet, the filtering process then continues at step 603. The hash value is also ready in the mean time. At step 603, a check is performed to see if the packet is a broadcast packet. If the packet is determined to be a broadcast packet at step 603, a broadcast system header is copied to the packet at step 604, in which the port of exit field in the packet is written with a broadcast port mask value. The broadcast packet counter is also incremented at the process goes to step 617 for source address check.

If the packet is not a broadcast packet, the hash value is used to search for a 32 byte record corresponding to the destination address at steps 605-613. First, the hash value is used to find a 16 bit pointer that points to the record at step 605. At step 606, a check is performed to see whether the pointer is a valid pointer. At every time when system 30 is powered on, these pointers are initialized as invalid. If the pointer is tested not valid at step 606, this destination address does not exist in the filter table memory 306 and the process goes to step 607. At step 607, the packet is marked for system processor 39 with the port of entry information of packet processor 300. To send the packet to system processor 39, a system processor system header is obtained with the bit 0 of the port of exit mask set with a value of 1. No more processing is required on this packet and the process exits to node 3.

If, however, the pointer obtained by using the hash value is tested valid at step 606, a record is then fetched at step 608 according to the pointer. The record includes a host address. The host address is then compared with the destination address at step 609. If the comparison fails at step 610, the pointer is incremented with the pointer link value in the record to reach the next record in the linked list at step 611 and the search process for the right record is repeated at step 606. If the pointer is found invalid at step 606, it means the end of the chain is reached and an entry for the destination address does not exist in filter table memory 306. The packet is meant to be sent to system processor 39 at step 607. This is done as described above by having a value of 1 at the first byte in the system processor system header and the port of entry at the fourth byte position. This is done by appending system broadcast system header obtained from pre-defined headers in filter table memory as described above.

Comparison starts as soon as a filter ACK signal from filter table memory 306 is received. A memory cycle is required to get the first byte of a record. The pointer is incremented in each cycle and the next record is compared. A filter table memory read request signal must remain asserted at filter table memory 306 throughout the comparison so that system processor 39 can not get the cycle.

If comparison at step 610 indicates that the record is found in filter table memory 306, a check is performed at step 612 to see if it is a source address check or a destination address check. If it is a source address check, the process then goes to step 620. If it is a destination address check, the record is then obtained at step 613 and the system header in the record is then appended to the packet.

Next, the process continues at step 613. The status byte of the record is checked. First the local/remote bit of the status byte is checked at step 614 to see if the packet is a local packet. If, at step 614, the local bit is determined to be set, the local packet counter is incremented and the packet is rejected by appending a reject system header which writes zero in the first byte of the system header at step 615. The process may then check the TRACE_DESTINATION bit of the status byte at step 616. Whenever system processor 39 wants a packet with a certain destination address to be sent to it for any reason, the TRACE_DESTINATION bit of the status byte is set. If the bit is tested at step 616 to be set, the packet is marked for system processor 39 and no further processing is required at step 617. The process then exits to node 3. If, on the other hand, the bit is not set, the packet counter is incremented at step 618, all the counters are kept in a contiguous block of filter table memory 306 so that the whole block of statistical counters can be read in a single string move instruction. At this stage, the filter process for the destination address is complete. The packet has been appended with an appropriate system header. The filter operation, however, is still not complete. The source address check has not been performed.

The source address check starts at step 618 by reading the source address hash value. The process then repeats steps 606-611 to search for a record corresponding to the source address. If the search fails at any time, the packet is marked for system processor 39 in its system header and the filtering process ends and packet processor 300 exits to step 626. A properly routed packet, however, may still be directed to system processor 39 as a result of the source address check. The port of exit value is overwritten by the source address check. Whenever the source address check fails, a system processor system header is appended to the packet.

A check is also performed at step 612 to determine if it is a source address check. At this time, it is a source address check and the operation goes to step 620 to check the status byte of the source address. At step 620, the local/remote bit is checked to ensure the source address is marked as local. If not, the packet must be marked for system processor 39 at step 621. At step 622, the TRACE_SOURCE bit is tested. If the bit is set, the packet is marked for system processor 39 at step 623. No further processing is needed and the process exits step 626.

If the bit is not set, a test is performed at step 624 to see if both the sample bit and the sample flag are set. If they are, the destination address of the packet must be stored at a fixed location in filter table memory 306 at step 625. The sample flag is then reset. The packet counter is also incremented at step 625. At step 626, the FILTER DONE signal is asserted and the input queue filter process is completed at step 627 for the packet.

Input control logic 309 throws away the packets which could not complete filtering and the packets that stop coming in during the filter operation. This is achieved by incrementing its buffer number counter to the next buffer if the FILTER DONE signal is seen asserted at the end of packet received. Since output control logic 311 also does not start shipping the packet until the filtering is done, the packet is never transmitted out.

FIG. 14-16 illustrate schematically some applications of network switching system 30. FIG. 14 shows network switching system 30 serving work groups. In FIG. 14, four network switching systems 30 at locations 701 through 704 are connected to four groups of workstations. One network switching system 30 at location 705 connects the four network switching systems 30 at locations 701-704 to a backbone network 12. In this hierarchical structure, the network switching system enhances the throughput of the work groups. Computing resources, such as file servers located on network, are fully available through the network switching systems 30. Additional bandwidth is also created by including network switching system 30 in this architecture. In one embodiment, no single node has more than approximately 120 microseconds of delay (approximately 40 microseconds for each network switching system 30) to reach any other node or backbone network. In one embodiment, the throughput capacity of the network configuration shown in FIG. 14 is greater than approximately 100 Mbit. FIG. 15 illustrates another application of network switching system 30. In FIG. 15, network switching system 30 serves as backbone traffic concentrator. In this configuration as shown in FIG. 15, network switching system 30 maintains work group throughput and reduces the number of bridges that would be other wise required to connect each work group to back bone network 12. Additionally, much of traffic local work groups need not go on the backbone network 12. Network switching system 30 can route traffic among network segments without excessive routing delays typically found in bridges.

FIG. 15 illustrates another application of network switching system 30. In FIG. 15, network switching system 30 serves to back end twisted-pair concentrator and as high performance network server front end. Switching capacity of the twisted-pair ("TP") concentrator (Local TP) in the network is increased by the incorporation of network switching system 30. As shown in FIG. 15, network switching system 30 offers a high performance method to back end the local twisted-pair concentrator.

Furthermore, FIG. 15 shows a high-performance network server connected to a network switching system 30. The high-performance network server is a parallel file server that is connected with three segment inputs of the network switching system 30. All bridging function is performed by network switching system 30 as a front end to the network server. Network bandwidth is increased.

In the foregoing specification the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A network switching system, comprising:
   a first port coupled to a first plurality of data processing devices, including a source;
   a second port coupled to a second plurality of data processing devices, including a destination;
   a third port coupled to a third plurality of data processing devices;
   multiplexer means coupled to the first port, the second port, and the third port for transferring data between the first port, the second port, and the third port by selectively connecting two of the first, second, and third ports, wherein when the data is transferred from the source to the destination through the first port, the multiplexer means couples the first port with the second port;
   processing means coupled to the multiplexer means for assisting in a transmission of the data by receiving the data from the first port when the first port does not indicate a port for the destination, wherein if the first port does not indicate a port of the destination, the data is first transferred from the first port to the processing means via the multiplexer means and the processing means then transfers the data to the second port and the third port via the multiplexer means to search for the destination, wherein if the first port indicates that the second port includes the destination, then the data is transferred to the second port via the multiplexer means without being transferred to the processing means.

2. The network switching system of claim 1, wherein the multiplexer means further comprises means for accepting a serial address from the first port, the second port, the third port, and the processing means.

3. The network switching system of claim 2, wherein the serial address is comprised of (a) a first bit corresponding to the first port; (b) a second bit corresponding to the second port; (c) a third bit corresponding to the third port; and (d) a fourth bit corresponding to the processing means.

4. The network switching system of claim 1, wherein the first port further includes a first memory and the second port includes a second memory, wherein the third port further includes a third memory.

5. The network switching system of claim 4, wherein the first memory stores (A) the relationship of each of the second plurality of data processing devices with the second port, (B) the relationship of each of the first plurality of data processing devices with the first port, and (C) the relationship of each of the third plurality of data processing devices with the third port, wherein the second memory stores (D) the relationship of each of the second plurality of data processing devices with the second port, (E) the relationship of each of the first plurality of data processing devices with the first port, and (F) the relationship of each of the third plurality of data processing devices with the third port, wherein the third memory stores (G) the relationship of each of the first plurality of data processing devices with the first port, (H) the relationship of each of the second plurality of data processing devices with the second port, and (I) the relationship of each of the third plurality of data processing devices with the third port.

6. The network switching system of claim 5, wherein the first port further includes means for removing the relationship of the first port and the source if the source does not communicate with the first port within a predetermined period of time, and wherein the second port further includes means for removing the relationship of the second port and the destination if the destination does not communicate with the second port within the predetermined period of time.

7. The network switching system of claim 5, wherein the first port further includes means for inspecting both (A) the data and (B) the first memory in order to find a port address of the second port, and means for appending the port address to the data before transmission.

8. The network switching system of claim 7, wherein the second port further includes means for stripping the port address off the data before the data is transferred to the destination.

9. The network switching system of claim 4, wherein the processing means further includes means for inspecting the data, the first memory, the second memory, and the third memory in order to find a port address of the first port, the second port, and the third port.

10. The network switching system of claim 4, wherein the processing means further includes means for updating the first memory and the second memory and the third memory.

11. The network switching system of claim 1, wherein the first port further includes a first-in first-out queue coupled to the multiplexer means for transferring the data.

12. The network switching system of claim 11, wherein the first-in first-out queue includes an additional bit that indicates the end of a first datum.

13. The network switching system of claim 1, wherein the second port further includes a first-in first-out queue, coupled to the multiplexer means, for receiving the data.

14. The network switching system of claim 1, wherein the first port further includes means for storing statistics regarding transfer of the data.

15. The network switching system of claim 1, further comprising a fourth part, wherein the multiplexer means further comprises means for providing parallel data transmission for other data among the third and fourth ports and the processing means while the data is being transferred from the first port to the second port via the multiplexer means.

16. The network switching system of claim 1, wherein the first port further includes means for hash computing a destination address contained in the data to shorten the time for processing the data.

17. The network switching system of claim 1, wherein the data is transferred from the first port to the second port without being fully buffered in the first port before transmission.

18. A method of transferring data from a source to a destination via a network switching system, comprising the steps of:
  (A) sending the data from the source to a first port;
  (B) inspecting the data for a destination address stored in the data in the first port, wherein the destination address indicates the data is sent to the destination;
  (C) sending the data to processing means via multiplexer means if the first port fails to indicate a port that is coupled to the destination indicated by the destination address of the data, wherein the processing means then accesses a plurality of ports via the multiplexer means for the port that is coupled to the destination indicated by the destination address;
  (D) sending the data directly to a second port via the multiplexer means without sending the data to the processing means if the second port is coupled to the destination indicated by the destination address and if the first port indicates that the second port is coupled to the destination;
  (E) sending the data to the destination from the second port.

19. The method of claim 18, wherein the step (B) further includes the steps of (1) searching for a port address of the second port corresponding to the destination address, and (2) appending the port address to the data before transmission if the port address is found.

20. The method of claim 19, wherein the step of appending appends a port address of the processing means if the step of searching fails to find the port address of the second port.

21. The method of claim 18, wherein at step (D) the data is sent directly from the first port to the second port via multiplexer means when the first port stores the destination address.

22. The method of claim 18, wherein the step (C) further includes the step of finding the destination address in the second port.

23. The method of claim 18, wherein the step (C) further includes the step of broadcasting by sending the data to the plurality of ports.

* * * * *